(12) United States Patent
Giles

(10) Patent No.: US 7,581,508 B2
(45) Date of Patent: Sep. 1, 2009

(54) MONOHULL FAST SHIP OR SEMI-PLANING MONOHULL WITH A DRAG REDUCTION METHOD

(76) Inventor: David L. Giles, 1250 S. Washington St., Apt. 222, Alexandria, VA (US) 22314

( * ) Notice: Subject to any disclaimer, the term of this patent is extended or adjusted under 35 U.S.C. 154(b) by 3 days.

(21) Appl. No.: 11/819,799

(22) Filed: Jun. 29, 2007

(65) Prior Publication Data

US 2008/0029014 A1 Feb. 7, 2008

Related U.S. Application Data

(60) Provisional application No. 60/817,077, filed on Jun. 29, 2006.

(51) Int. Cl.
*B63B 1/32* (2006.01)
(52) U.S. Cl. ..................... 114/289; 114/67 A
(58) Field of Classification Search ............... 114/61.2, 114/61.26, 67 A, 121, 271, 289, 67 R, 74 A, 114/74 R
See application file for complete search history.

(56) References Cited

U.S. PATENT DOCUMENTS

| | | | |
|---|---|---|---|
| 2,185,430 A | 1/1940 | Burgess | |
| 2,242,707 A | 5/1941 | Haynes | |
| 2,342,707 A | 2/1944 | Troyer | |
| 2,954,750 A | 10/1960 | Crump et al. | |
| 3,628,488 A | 12/1971 | Gibson | |
| 4,079,688 A | 3/1978 | Diry | |
| 4,186,679 A | 2/1980 | Fabula et al. | |
| 5,054,412 A | 10/1991 | Reed et al. | |
| 5,080,032 A | 1/1992 | Giles | |
| 5,129,343 A | 7/1992 | Giles | |
| 5,231,946 A | 8/1993 | Giles | |
| 5,832,856 A | 11/1998 | Giles | |
| 6,092,480 A * | 7/2000 | Takahashi et al. | 114/67 A |
| 6,138,704 A | 10/2000 | Babenko | |
| 6,145,459 A * | 11/2000 | Takahashi et al. | 114/67 A |
| 6,200,014 B1 | 3/2001 | Babenko | |
| 6,237,636 B1 | 5/2001 | Babenko | |
| 6,305,399 B1 | 10/2001 | Babenko | |
| 6,349,734 B1 | 2/2002 | Babenko | |
| 6,357,374 B1 | 3/2002 | Moore et al. | |
| 6,357,464 B2 | 3/2002 | Babenko | |

(Continued)

OTHER PUBLICATIONS

International Search Report and Written Opinion; International Application No. PCT/US07/15135; International Filing Date: Jun. 29, 2007.

(Continued)

*Primary Examiner*—Lars A Olson
(74) *Attorney, Agent, or Firm*—Antonelli, Terry, Stout & Kraus, LLP.

(57) ABSTRACT

A monohull surface ship has a hull having a profile which produces a high pressure area at a bottom portion of the hull in a stern section of the hull and hydrodynamic lifting of the stern section at a speed above a length Froude number of 0.30. The ship includes an apparatus for introducing a drag reducing substance into the boundary layer of water flowing over a submerged portion of the hull in substantially straight flow lines relative to the waterline to reduce skin-friction over a relatively large wetted area of the hull at speeds exceeding a length Froude number of 0.25.

9 Claims, 22 Drawing Sheets
(2 of 22 Drawing Sheet(s) Filed in Color)

U.S. PATENT DOCUMENTS

| | | |
|---|---|---|
| 6,435,214 B2 | 8/2002 | Babenko |
| 6,748,891 B2* | 6/2004 | Takahashi ............... 114/67 A |
| 2001/0022152 A1* | 9/2001 | Takahashi ............... 114/67 A |
| 2002/0014192 A1* | 2/2002 | Takahashi et al. ......... 114/67 A |

OTHER PUBLICATIONS

H.L. Dove, H.J.S. Canham, J.P. Catchpole, R.F. Long; Trails on HMS highburton effect of the ejection of polyox into the boundary layer; Jul. 1969.

K.J. Moore; Engineering an Efficient Shipboard Friction Drag Reduction System; 2005.

B.F. Dronov, B.A. Barbanel; Research Submarine-laboratory. Project 1710; Dec. 1998; pp. 1-14.

Ivanyuta Yu. F., Orlov O.P., Rusetsky A.A., Khomyakov A.A; Results and Prospect of Using Drag-Reducing Polymers in Shipbuilding Applications; pp. 1-15.

Indian Princess; Apr. 2006; Report No. 1895; Wolfson Unit for Marine Technology & Industrial Aerodynamics.

International Preliminary Report on Patentability; mailed May 8, 2009 in International Application No. PCT/US07/15135; International Filing Date: Jun. 29, 2007.

* cited by examiner

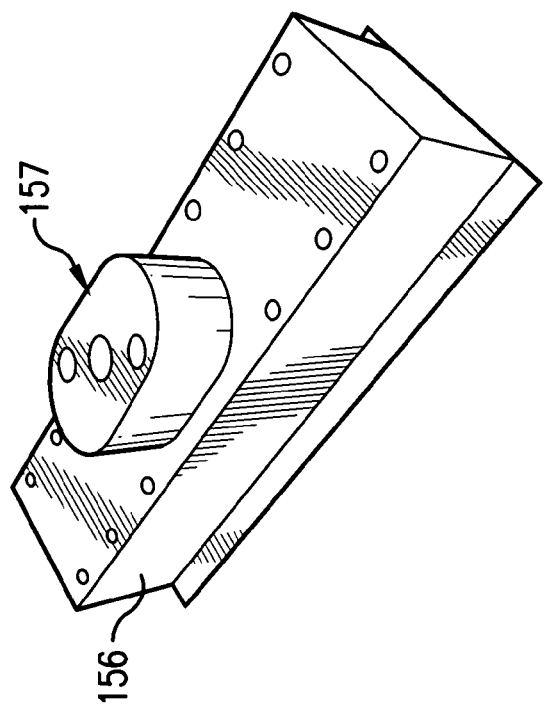
FIG. 9iiB
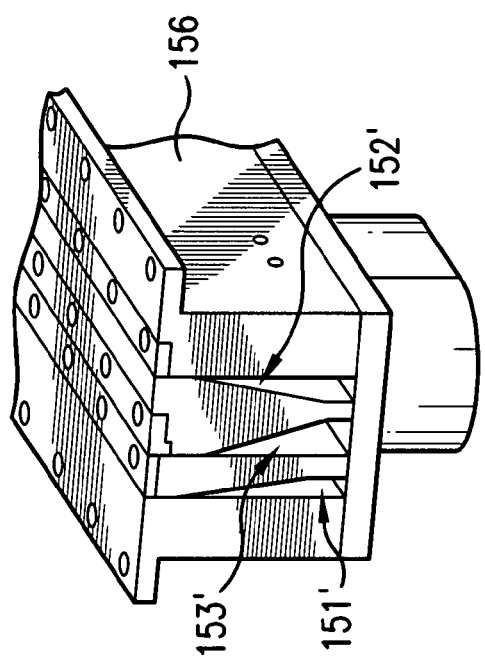
FIG. 9iiA

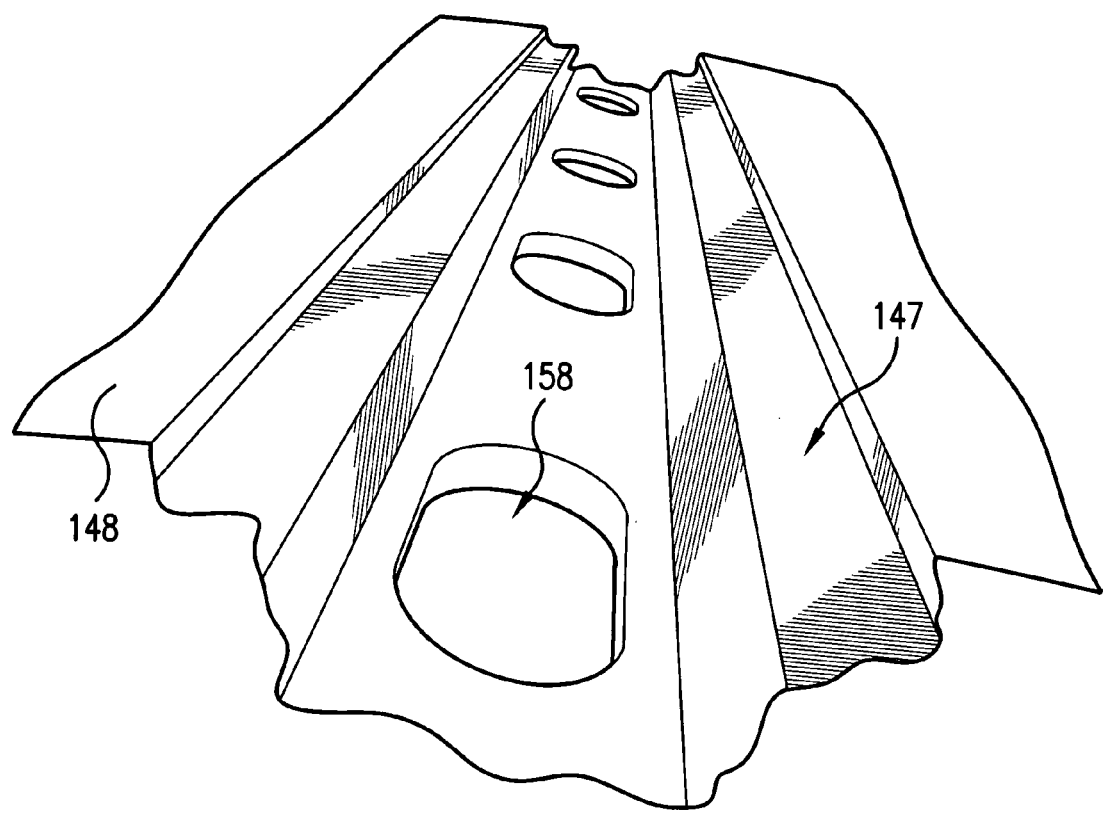
FIG.9iii

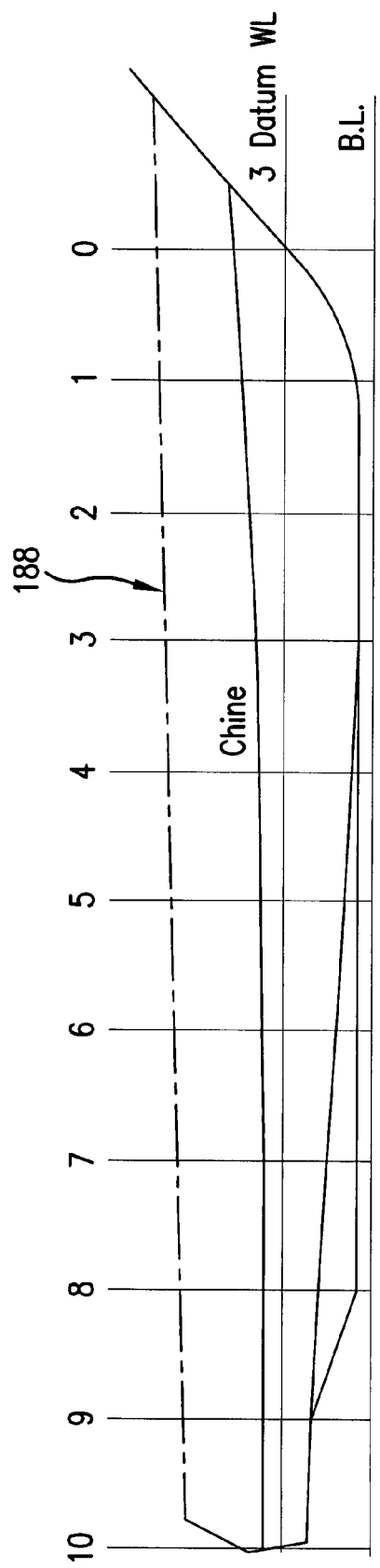

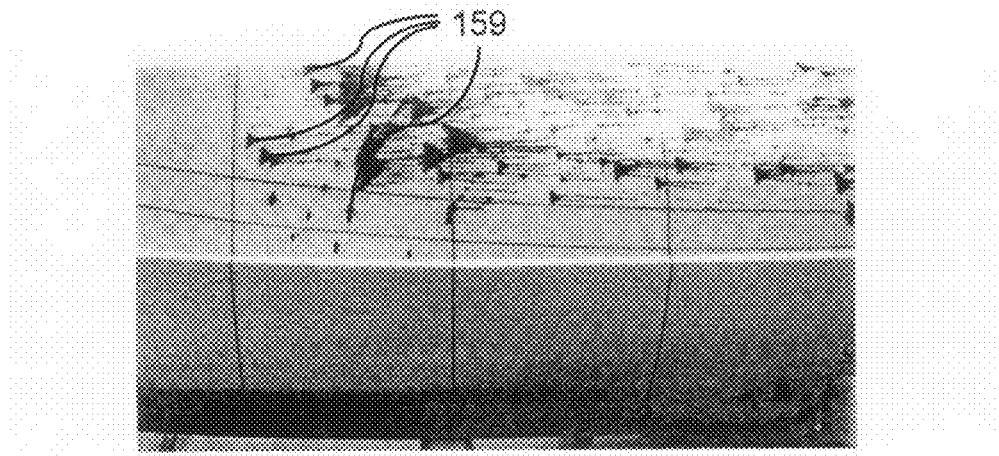
FIG.10iiA
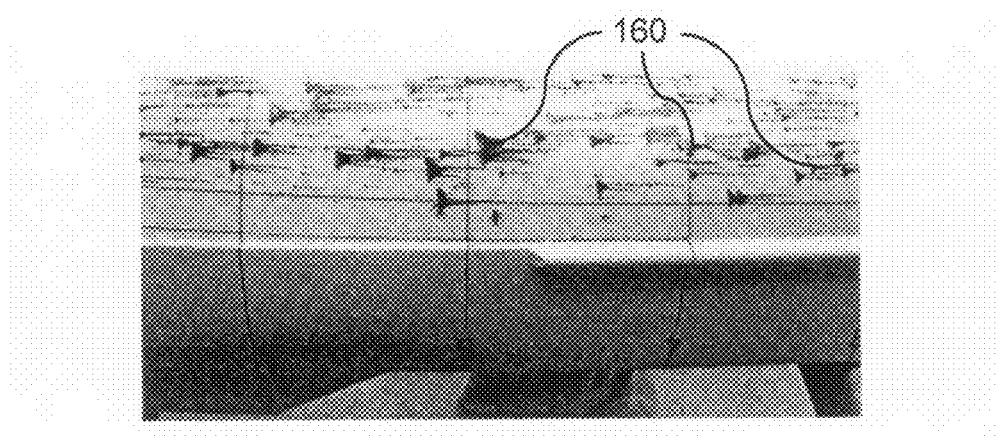
FIG.10iiB
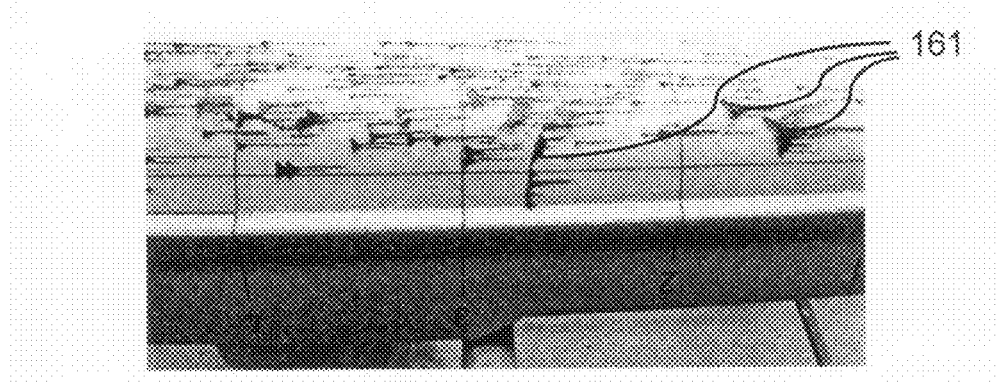
FIG.10iiC

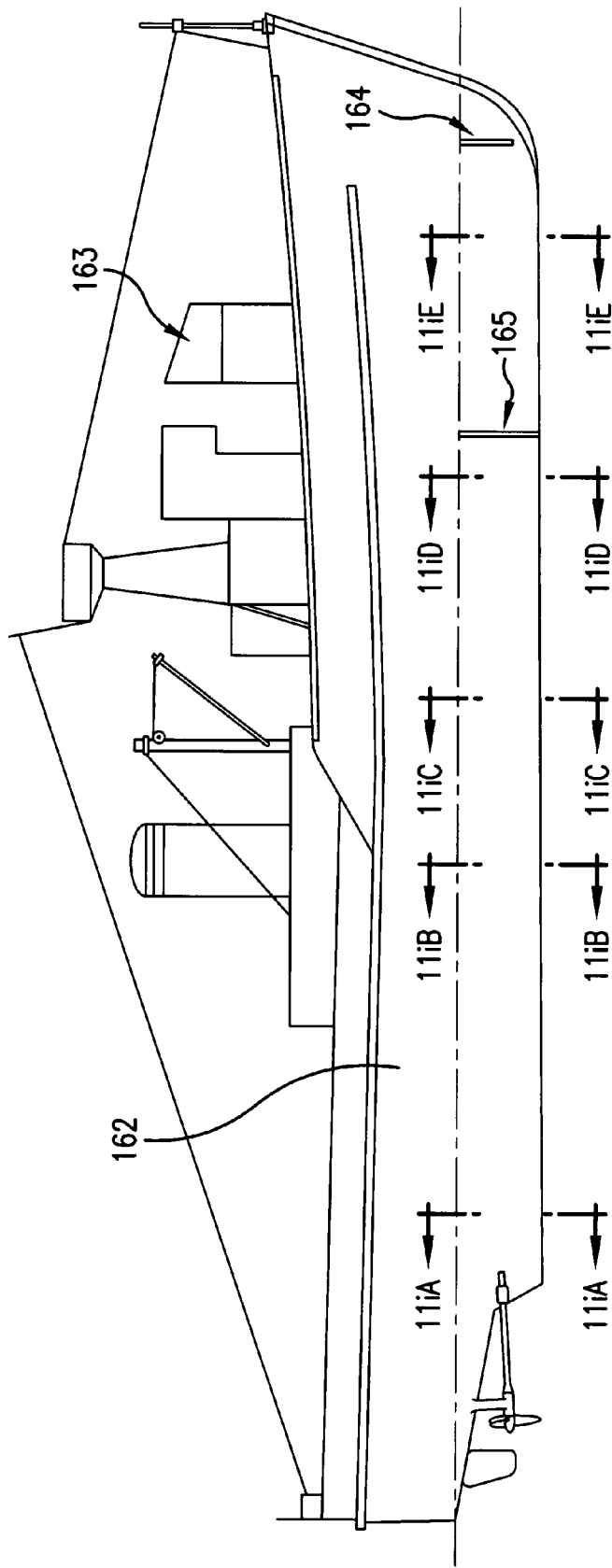

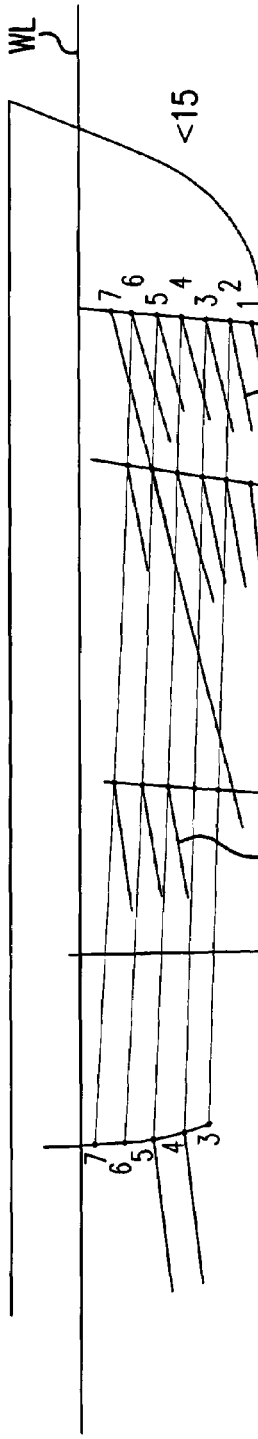
FIG.11iiA
LENGTH FROUDE No.=0.19
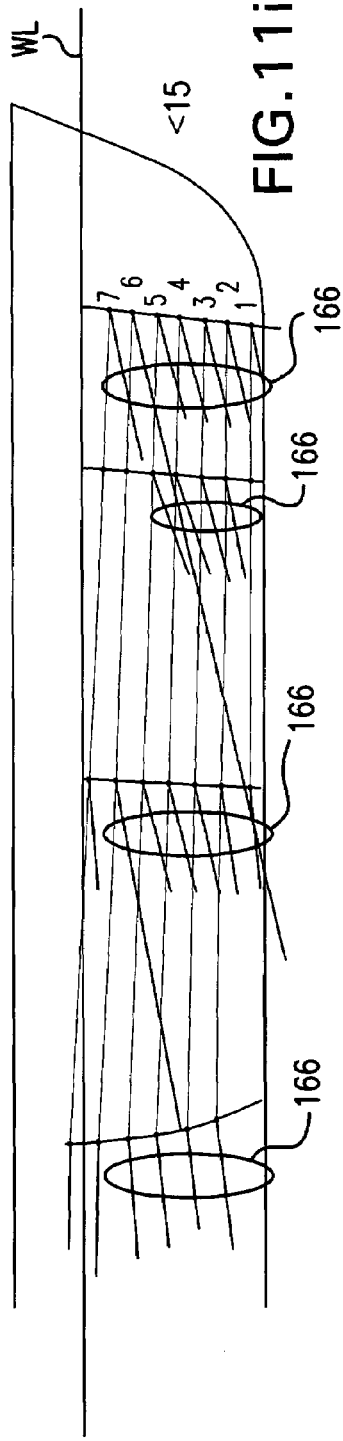
FIG.11iiB
LENGTH FROUDE No.=0.29
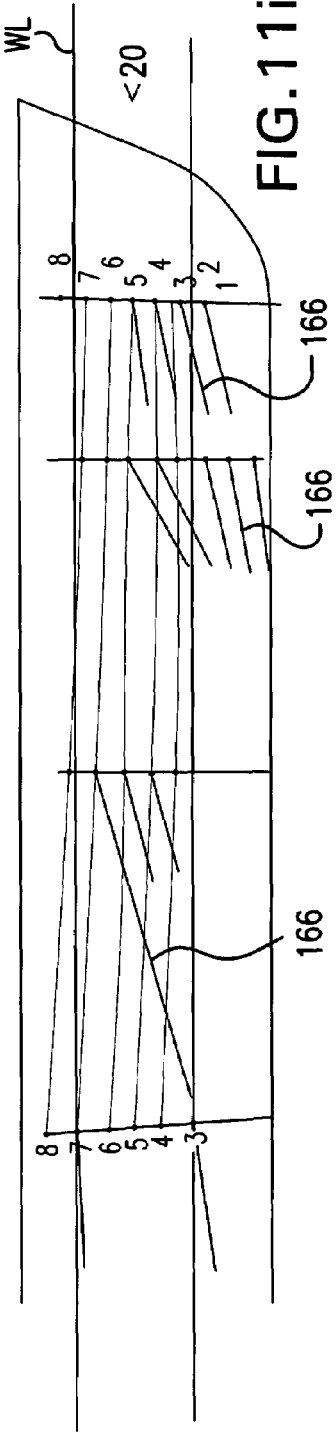
FIG.11iiC
LENGTH FROUDE No.=0.34

MONOHULL FAST SHIP OR SEMI-PLANING MONOHULL WITH A DRAG REDUCTION METHOD

RELATED APPLICATION

This application claims priority of U.S. provisional application No. 60/817,077 filed Jun. 29, 2006. The disclosure of this priority application is hereby incorporated by reference.

TECHNICAL FIELD

The present invention relates to a monohull surface ship, a fast ship whose hull design in combination with a waterjet propulsion system permits, for ships of about 25,000 to 30,000 tons displacement with a cargo carrying capacity of up to 10,000 tons, transoceanic transit speeds of up to 37 to 50 knots in high or adverse sea states, speeds heretofore not achievable in ships of such size without impairment of stability or cargo capacity or constructed at such prohibitive cost as to render them commercially or militarily unviable.

BACKGROUND AND SUMMARY

It has long been the goal of naval architects to design and construct vessels with adequate internal capacities and accommodations, structural strength, stability and seaworthiness with sufficiently small resistance to economize propelling power at high speeds as evidenced by U.S. Pat. Nos. 2,185,430; 2,342,707 and 4,079,688.

Traditional surface ship monohull designs have usually been developed from established design principles and assumptions which concern the interrelationships of speed, stability and seakeeping. Such sacrifices have to be made to achieve significantly higher performance than hitherto that current practical displacement monohull surface ship speed improvements are essentially stalled.

For example, a major limitation of present day displacement hulls is that, for a given size (in terms of displacement or volume), their seaworthiness and stability are reduced as they are "stretched" to a greater length in order to increase maximum practical speed.

Traditional hull designs inherently limit the speed with which large cargo ships can traverse the ocean because of the drag rise which occurs at the "threshold speed". This is a speed (in knots) which is about equal to the square root of the ship's length (in feet). For example, a mid-size cargo ship at about 600 feet length has an economical operating speed of about 20 knots or some 4 knots below its design threshold speed. In order to achieve higher operating speeds with commercial loads, it is necessary to increase ship length and size (or volume) in proportion, or to increase length while reducing width or beam, to maintain the same size and volume, but at the expense of stability. Naval architects have long considered the problem of achieving significantly higher ship speeds, without increasing length or decreasing beam, as the equivalent of approaching, or "breaking the sound barrier" in aeronautical technology. However, new techniques can reduce the effect of this problem in ships as it has done in aircraft.

Recently there have been analogous developments in hull design and propulsion, as described in the prior art (U.S. Pat. Nos. 5,080,032; 5,129,343; 5,231,946; and 5,832,856) with the Semi-Planing Mono-Hull Fast Ship (hereinafter MFS), employing hydrodynamic lifting beneath the stern section to allow operation above the traditional 'Threshold Speed' of a length Froude No. of approximately 0.3. This has been achieved, in association with waterjets rather than propellers which are much less efficient at the higher speeds involved.

In the nineteenth century, Dr. Froude first accurately measured and defined the phenomenon by which increased length is required for higher ship speeds because of the prohibitive drag rise (hereinafter referred to as 'residuary resistance', 'wave drag', or 'pressure drag') which occurs at a threshold speed corresponding to a length Froude Number of 0.3. The length Froude Number is defined by the relationship 0.298 times the speed length ratio $$\frac{V}{\sqrt{L}},$$

where V is the speed of the ship in knots and L is the waterline length of the ship in feet. Thus a Froude number of 0.298 equates to a speed length ratio of 1.0. According to Froude's teaching, to go faster for the same volume the ship must be made longer, thus pushing the onset of this drag rise up to a higher speed. As length is increased for the same volume, however, the ship becomes narrower, stability is sacrificed, and it is subject to greater stress, resulting in a structure which must be proportionately lighter and stronger (and therefore more costly) if structural weight is not to become excessive. In addition, while for a given displacement the longer ship will be able to achieve higher speeds, the natural longitudinal vibration frequency is lowered and seakeeping degraded in high or adverse sea states as compared to a shorter, more compact ship.

Hull designs using the concept of hydrodynamic lift are known with regard to smaller ships, e.g. below 200 feet or 600 tons powered by conventional propeller drives as shown in U.S. Pat. No. 2,242,707. The shape of this hull is such that high pressure is induced under the hull in an area having a specific shape to provide hydrodynamic lift.

The monohull fast ship (MFS) develops hydrodynamic lift above a certain threshold speed as a result of the presence of high pressure under the aft part of the hull and also in the upper surfaces of the inlet pipes for the waterjets. Such a hull reduces the residuary resistance of the hull in water. Therefore, power and fuel requirements are decreased. Since hydrodynamic lift increases as the square of the velocity, a lifting hull allows higher speeds to be achieved than a traditional hull which tends to "squat" or sink at speeds above a Froude number of 0.42 or a speed length ratio of 1.4.

Today's container ships are tending towards greater size, for reduced cargo ton-mile costs, carrying up to 25,000 tons of containerized cargo at a time. This necessitates their visiting a number of ports on both sides of an ocean crossing to load and unload cargo. This is time-consuming and means that the largest ships can only undertake a relatively small number of ocean crossings per year, thus limiting the available financial turnover on their considerable investment cost.

A much faster—but smaller—ship, operating at between 40 and 50 knots, can undertake a transatlantic roundtrip each week between only one port on each side of the ocean crossing. Although carrying only up to 10,000 tons of cargo, this smaller, faster ship could transport about 60% more cargo per year than the larger ship, with each container being subject to a much more controlled collection and delivery system using more disciplined intermodal techniques because at each port the ship is fully unloaded and reloaded. Thus the time taken from pick-up to delivery of each container (door-to-door) could be significantly reduced. For this service a cost premium may be charged, such as is presently charged for airfreight, lying somewhere between the current sea and airfreight tariffs. This premium, together with the much greater cargo turnover on each ship, more than compensates for the increased fuel consumption required for operating at over twice the speed of most current larger container ships. However, as fuel costs rise and the average size of traditional container ships increases, the premium above sea freight tariffs required for competitive operation of the faster, but smaller ship is correspondingly increased. Therefore it is desirable to provide an improved ship or vessel of the aforementioned monohull fast ship type having reduced fuel consumption, thus lowering the cost premium, to a more competitive level.

For many years naval architects have sought to reduce the frictional drag of ships or submerged bodies by the application upon the hull of certain chemicals or materials, or the ejection of certain gases, water or substances into the boundary or turbulent layer of vortices which is excited by the movement of a body through the water. (These are summarized in Technical Papers such as those by K. J. Moore (2005); Dronov and Barbanel (1998); Ivanyuta, Orlov, Rusetsky and Khomaayakov (1996) and Dove, Canham, Catchpole and Long (1969) . . . ; and in U.S. Pat. Nos. 6,138,704; 6,357,374B1; 6,357,464B2; 6,200,014B1; 6,435,214B2; 6,237,636B1; 6,305,399B1; and 6,349,734B1). However this research has previously been restricted to slow mono-hulls that operate at length Froude Numbers below the onset of substantial wave-drag; or to submarines and torpedoes when submerged below a certain depth, at which wave-drag is minimal and, due to a largely circular and constant cross-section of their wetted area and their hulls being totally immersed, their water flow-lines are correspondingly straight.

All of the above buoyant surface hulls which were the subject of such research exhibit low wave or pressure drag at their operating speeds, being designed in accordance with the traditional principles of Dr. Froude described in the Applicant's U.S. Pat. Nos. 5,080,032, 5,129,343, 5,231,946 and 5,832,856 in which certain desirable ship features are sacrificed in order to reduce installed power in relation to their size, displacement and speed. To date it has not been considered feasible to incorporate such technology in buoyant surface hulls above a length Froude Number of 0.30 due to the non-uniform distribution of the additive and the excessive amount of the frictional reducing additive required for significant drag reduction. Applicant believes that this inapplicability of the friction reducing technology to the hulls of conventional surface ships results, at least in part, because the water flow-lines along the submerged portion of the hulls in these ships are characteristically drawn towards the keel by the low pressure generated by their passage through the water; such low pressure and downward and, towards the stern, upward movement of flow-lines increasing with speed, thus further reducing the effectiveness of the drag reducing method.

The addition of a bow-bulb has been used in reducing this downward movement of flow-lines for low-speed hulls but, above the threshold speed range of a length Froude Number of 0.30, characteristic of the monohull surface ship of the present invention, such a measure can seriously reduce directional stability with negligible reduction in drag. Another problem associated with the application of this friction drag reducing technology to a conventional hull is the effect of the drag-reducing additive upon the propulsive efficiency of the propellers situated downstream at the back of the hull, creating propeller cavitation leading to loss of propulsive efficiency which can reduce the benefit of any reduction in friction drag and also drawing off the additive into the propeller race, thus reducing its effect on the boundary layer of the aft hull.

This is described in the aforementioned report on the 1968 experiments of Dove, Canham, Catchpole and Long (hereinafter the Dove et al. report) in model and a full-scale measurement of the British naval vessel HMS 'Highburton' and in model measurements of a fast, slender frigate hull, the only known instance of a previous attempt to adapt this drag reducing method to prior art surface hulls. Factors contributing to their conclusion that "the scheme is far from economically viable" were: the use of excessive amounts of additive due to an unsatisfactory ejection system and the non-uniform water-flow, and the reduction of a maximum of only 36 percent in friction drag at length Froude Nos. of about 0.23, above which speed the effect of the additive rapidly declined, due to increasingly non-uniform flow-lines with increasing speed; and the drawing of the mixture off the aft portion of the submerged hull into the propeller races.

To quote further from the aforementioned Dove et al. report (page 8), "One of the problems encountered during the trials has already been mentioned, namely, uneven distribution of Polyox [the friction reducing polymer powder being applied] in the inner boundary layer. Clearly from the measured Polyox concentrations on the hull surface, as given in Annex B, the Polyox distribution was not as efficient as originally expected. Flow directions established by model tests, shown in FIG. 12, suggest that the steep downwash at the forward duct position may have carried a large proportion of the Polyox ejected there down towards the keel. The ejection of the after duct was far less affected. The curves in FIG. 11 show that concentrations greater than 10 weight parts per million (wppm) have little more effect than 1 wppm and hence the distribution in the keel area appears to have been wasteful. Further, the measured concentration along the sides above the turn of the bilge was generally very low and hence frictional drag reduction effected by the change of shear rate at the hull surface may have been correspondingly low. Further research on these aspects are obviously necessary."

Annex B of the report by Dove et al. concludes on page 10, Section 10 (c): "Boundary layer samples analysed for Polyox revealed:

1. a substantial discrepancy between the amount of Polyox ejected from the ship's hull and that detected in the boundary layer, indicating a considerable loss of Polyox from the boundary layer;

2. non-uniform distribution of Polyox around the ship's girth;

3. lower concentrations in the boundary layer at higher ship speeds."

For the above, and other reasons, such friction drag reduction technology has not been used in fast surface ship hulls, such as planing monohulls, operating at speeds far above the threshold speed corresponding to a length Froude Number of 0.3, because of the traditional increase in wave-drag in the speed regime through which they have to transition before aqua-planing on the surface of the water at their efficient operating speeds above a length Froude No. of about 1.5 In this case the reduction of friction-drag over their higher transitional speed regime would represent a minimal proportion of the overall drag of the ship, and the use of such a technology has hitherto not been considered worthwhile.

However, in the case of the improved monohull fast ship or semi-planning monohull vessel of the present invention disclosed hereinafter, the wave-drag is reduced to a constant rather than exponentially increased above the threshold speed, and it has been found that the application of drag reducing technology in accordance with the invention makes an important contribution to reducing overall drag, since a friction-drag reduction of sixty percent attainable with the invention is achieved concurrently with a reduction in overall drag of fifteen to thirty percent achieved when operating the improved ship or vessel of the present invention close to the threshold speed. These are the speeds at which a commercial version of the present invention would most likely operate.

This reduction in overall drag due to hull form is demonstrated by comparison of the drag curves of hulls of ships like the present invention with the drag curves of traditional vessels as shown in FIGS. 11 and 14 in the Applicant's aforementioned U.S. Pat. Nos. 5,080,032; 5,129,343; and 5,231, 946. These show a fifteen to thirty percent reduction in overall drag due to the reduction in wave drag created by the hydrodynamic lifting properties of the aft part of the hull compared with conventional hulls. Moreover, it has been found by Applicant that due to substantially neutral or high pressure over the wetted area of the hull, the water flow lines are substantially straight relative to the waterline, thus allowing the friction drag reducing polymer/air/water mixture utilized by the ship of the invention to spread regularly over the entire wetted area aft of the ejection site of the mixture in a manner that greatly reduces friction drag of the ship. The resulting cumulative reduction in overall drag represents an important decrease in fuel consumption and cost for a given payload and speed and, hence, a significant reduction in freight tariff premium and/or improvement in operating efficiency.

The substantially straight flow lines of water with a hull of the type employed in the ship of the present invention have been confirmed by Applicant when measured along the underwater portions of the hull by paint-streak tests with scale models in testing tanks, these substantially straight flow lines having been mathematically predicted based on computational fluid dynamics analysis conducted by Applicant. The application of drag reducing technology in the ship of the present invention exploits this characteristic recognized by Applicant to substantially reduce overall drag with the ship operating at close to the threshold speed. This considerable improvement in operating efficiency is also due to the increasing pressure beneath the hull as it approaches and exceeds a threshold speed of a length Froude No. of 0.25. This is in contrast to a conventional hull which generates greater low pressure or suction at such a speed, the flow being sucked down towards the keel and becoming uneven, which would inhibit the effect of introducing a friction drag reducing material such as a polymer/air/water mixture and reduce the wetted area to which the mixture would attach in an optimum uniform pattern.

Furthermore, due to the hull propulsion method employed in the ship of the present invention wherein waterjets, rather than propellers are employed, the problems of propeller cavitation with application of friction drag technology are avoided for the reasons referred to above. In the present invention, there is also the possibility that the additive flowing into the waterjet ducts can increase their propulsive efficiency by reducing the boundary layer over their surface area and thus accelerating the flow of water through the water jets.

For the reasons already given, it is impracticable to achieve a major increase in speed by the traditional method of making container ships very long because, as their length is increased for a given volume or displacement, to raise their threshold speed according to Froude's laws, their cargo payload, beam and, hence, stability are eroded. Serious questions also arise over the ability of propellers to deliver the necessary power due to their performance being degraded by the onset of cavitation, their impractical size and the problems of optimizing blade pitch at intermediate speeds, which could necessitate very complex gearboxes.

The Applicant's U.S. Pat. Nos. 5,080,032, 5,129,343, 5,231,946 and 5,832,856, which are incorporated herein by reference in their entirety, provide a solution to the prior art that combines high speed, economic operation, and a wide and resilient hull providing substantial cargo carrying capacity for transoceanic shipping.

FIG. 1 illustrates a ship in accordance with the Applicant's patents, designated generally by the numeral 10, having a semi-displacement or semi-planing round bilge, low length beam ratio (L/B) hull form utilizing hydrodynamic lift at high payloads, e.g. up to 10,000 tons for transatlantic operation at speeds in the range of 40 to 50 knots. The L/B ratio is preferably between about 5.0 and 7.5. The ship has a waterline length over 215 feet and, as illustrated in FIG. 3, has a datum waterline length of 679 feet and a displacement length ratio between 60 and 150.

The ship 10 has a hull 11 known as a semi-planing round-bilge type with a weather deck 12. A pilot house superstructure 13 is located aft of amidships to provide a large forward deck for cargo and/or helicopter landing, and contains accommodations, living space and the controls for the ship as well as other equipment as will be hereinafter described. The superstructure 13 is positioned so as not to adversely affect the longitudinal center of gravity. A commercial vessel is depicted in the form of a cargo ship in excess of 2000 tons displacement such as but not limited to 20-30 thousand tons but the prior art design is also applicable to pleasure craft in excess of 600 tons.

The longitudinal profile of the hull 11 is shown in FIG. 1, a body plan is shown in FIG. 3. A base line 14 shown in dashed lines in FIG. 1 depicts how the bottom 15 of the hull 11 rises from a point of maximum depth towards the stern 17 and flattens out at the transom 30. The bottom 15 of the hull has a non-convex longitudinal profile with respect to the baseline 14 from the point of maximum depth to the point of minimum depth. This contour is also illustrated in sectional form in FIG. 3 and runs from a maximum depth to a point of minimum depth at the transom which is less than 60% of the depth at point, in order to provide the necessary high pressure for exceeding the threshold speed without incurring prohibitive transom drag at lower length Froude Numbers. This is a significant feature of the present invention in providing the speed requirement of the present invention which typically operates between Froude Nos. of at least 0.40 and preferably of 0.42 and 0.9. FIG. 3 is a presentation of the sections of the monohull fast ship (MFS) hull form of 679 feet datum waterline length with the right side showing the configuration at the forward section of the ship and the left side showing the configuration at the aft section. The drawing describes the cross-section of the MFS hull in terms of meters from the beam center line and also in tenths of the ship's length from the forward perpendicular to the aft perpendicular. The MFS hull has a traditional displacement hull shape with a keel in the forward section and a flattened bottom in the aft section. In smaller vessels, a centerline vertical keel or skeg 65 shown in phantom lines in FIG. 1 may be fitted, extending from about the deepest point of the forward bilge to a point about one-quarter to one-third of the ship's length forward of the transom 30. This keel or skeg improves directional stability and roll damping in smaller ships.

It is this hull configuration which produces at a threshold speed a hydrodynamic lift under the aft section to reduce drag in relation to conventional displacement hulls as demonstrated in FIG. 14 of the Applicant's patents referred to above.

At the transom (station or Contour line 10), the distance between the ship's centerline and its conjunction with the ship's side is at least 85% of the distance between the centerline and the point of maximum beam. This is in order to accommodate sufficient space for waterjet inlets, or propellers, to deliver the horsepower necessary for speeds of Froude Numbers=0.42 to 0.9. Station or Contour lines numbered 0-2 in FIG. 3 show the non-convex form of hull shape with associated "knuckle" in the bow section 16 viewed from right to left in FIG. 1, whereas the station or contour lines numbered 3-10 show how the bilge in the stern section 17 becomes progressively convex and flattened as also viewed from right to left in FIG. 1. Although there is presently no agreed method for determining the precise speed of onset of hydrodynamic lift as a result of the size and shape of this hull, it has been suggested that such lift is assisted by the flattening of these sections and its onset takes place at a speed length ratio of 1.0 or Froude Number of 0.298 (or a threshold speed of about 26.06 knots at a displacement of 22,000 tons, in the case of the 679 feet MFS). The waterline of the hull, in plan view is at all points non-convex with reference to the vessels centerline in order to reduce slamming in the forward sections whilst retaining maximum waterplane area for operating at higher displacement length ratio than taught by prior art. The acute angle between the contour line 10 (transom) at the point of intersection with a horizontal transverse datum line is a maximum of 10 degrees. The ship, as illustrated in FIG. 3, has a maximum operating speed of above 34.5 knots and has a maximum displacement of over 600 tons.

The round-bilge hull 11 thus has a "lifting" transom stern 17 which, as is known, is produced by the hydrodynamic force resulting from the hull form which is generally characterized by straight entrance waterlines, rounded afterbody sections typically rounded at the turn of the bilge and non-convex aft buttock lines terminating sharply at the transom. This type of hull is not a planing hull. It is designed to operate at maximum speeds in the Froude Number range of 0.40 and preferably above about 0.42 and below about 0.9 by creating hydrodynamic lift at the afterbody of the hull by the action of high pressure under the stern but without excessive transom drag at moderate Froude Numbers of above about 0.42 to 0.6 within the "threshold" speed range.

The combination of bow sections which are fine at and below the waterline, with a deep forefoot (or forward keel) and full sections above the bow knuckleline are a major factor in reducing bow emergence, slamming accelerations and spray generation at the bow in high sea states. The high pressure at the stern also acts to dampen out excessive pitching, thus reducing longitudinal stress on the hull girder. This is another feature of the improved ship of the invention that contributes to the efficiency of the drag-reduction of the ship since it reduces non-uniform water-flow at the bow, close to the possible position of the forward line of ejectors, in higher sea states.

Because of the shorter hull design, the hull will achieve required structural strength with greater ease than a long, slender ship for a given displacement. The shape which produces hydrodynamic lift in the semi-planning monohull (SPMH) is well known and its dimensions can be determined by requirements of payload, speed, available power and propulsor configuration. A three-dimensional hull modeling computer program of a commercially available type can generate the basic SPMH form with the foregoing requirements as inputs. Once the basic hull parameters are determined, an estimate of the displacement can be made using, for example, two-digit analysis with weight codings from the standard Shipwork Breakdown Structure Reference 0900-Lp-039-9010.

In addition, the shorter hull produces a higher natural frequency which makes the hull stiffer and less prone to failure due to dynamic stress caused by waves, while allowing, in combination with the propulsion system hereinafter described, achievement of speeds in the 40 to 50 knot range.

Waterjet propulsors utilizing existing mixed flow, low pressure, high volume pump technology to produce very high thrust of the order of 200 tons are incorporated in the ship. The waterjet propulsors are driven by conventional marine gas turbines sized to obtain the high power required. The waterjet propulsor presently contemplated for use is a single stage design which is uncomplicated in construction, and produces both high efficiency and low underwater noise at propulsion power in excess of 100,000 HP.

FIGS. 4 and 5 illustrate schematically one embodiment of the waterjet/gas turbine propulsion system. In particular, four waterjet propulsors 26, 27, 28, 29 (one of which is illustrated in FIG. 15 of the Applicant's patents) are mounted at the transom 30 with respective inlets 31 arranged in the hull bottom just forward of the transom 30 in an area determined, on an individual hull design basis, of high pressure. Water under high pressure is directed to the impellers of the pumps of the waterjets from the inlets 31. The flow of seawater is accelerated at or around the inlets 31 by the pumps of the four waterjets 26, 27, 28, 29, and this flow acceleration produces additional upward dynamic lift which also increases the hull efficiency by decreasing drag.

The two outermost waterjets 26, 27 are wing waterjets for maneuvering and ahead thrust. Each of the wing waterjets 26, 27 is provided with a horizontally pivoting nozzle 34, 35, respectively, which provides angled thrust for steering. A deflector plate (not shown) directs the jet thrust forward to provide for stopping, slowing control and reversing in a known manner. Steering and reversing mechanisms are operated by hydraulic cylinders (not shown) or the like positioned on the jet units behind the transom. The hydraulic cylinders can be powered by electrical power packs provided elsewhere in the ship. The waterjet propulsion and steering system allows the vessel to be maneuvered at a standstill and also to be decelerated very rapidly.

Marine gas turbines of the type exemplified by General Electric's LM 5000 require no more than two turbines, each rated at 51,440 HP in 80° F. ambient conditions, per shaft line through a conventional combining gearing installation. Eight paired conventional marine gas turbines 36/37, 38/39, 40/41, 42/43 power the waterjet propulsion units 26, 28, 29, 27, respectively, through combined gear boxes 44, 45, 46, 47 and cardan shafts 48, 49, 50, 51. Four air intakes (only two of which 52, 53 are shown in FIGS. 1 and 4) are provided for the turbines 36 through 43 and rise vertically above the main weather deck and open laterally to starboard and port in the superstructure 13 provided in the aft section. Eight vertical exhaust funnels 54, 55, 56, 57, 58, 59, 60, 61 (FIGS. 2 and 4) for each gas turbine also extend through the pilot house superstructure 13 and discharge upwardly into the atmosphere so as to minimize re-entrainment of exhaust gases. The exhaust funnels can be constructed of stainless steel and have air fed therearound through spaces in the superstructure 13 underneath the wheelhouse.

The gas turbine arrangement can take several forms to achieve different design criteria. For example, FIG. 8A of the Applicant's aforementioned patents shows one embodiment where only four pairs of in-line gas turbines are used to obtain smaller installation width. A gear box is provided intermediate each pair of in-line turbines. This arrangement results in a somewhat greater installation length and a higher combined gear box and thrust bearing weight for each shaft. FIG. 8B of the Applicant's patents is an embodiment which reduces the installation length where installation width is not deemed essential. Combined gear box and thrust bearing weight per shaft is also reduced to a minimum and to a like amount as the embodiment of FIG. 8D of the Applicant's patents where installation width is somewhere between the embodiments of FIGS. 8A and 8C of the Applicant's patents. The embodiment of FIG. 8C of the Applicant's patents has the gas turbines in two separate rooms to reduce vulnerability.

At constant displacement, horsepower and waterjet efficiency, speed increases as displacement falls. A linear relationship exists at speeds above 35 knots between delivered horsepower for a vessel of 22,000 tons displacement and ship speed, assuming a certain percentage of negative thrust deductions at certain speeds. For example, to achieve a ship speed of 41 knots, required delivered horsepower will be about 380,000 according to present tank tests.

At 30 knots, the ship in accordance with the present invention is comparable in performance measured in terms of specific power (where HP=the delivered horsepower, D=displacement in long tons and V=speed in knots) to various other classes of lower speed naval vessels according to length and size. At speeds of 45 knots, however, the vessel in accordance with the Applicant's patents is in a unique speed class.

In the improved ship of the invention, as in the SPMH in accordance with Applicant's patents, the ship incorporates a fuel system which enables the ship to operate at optimum trim or longitudinal center of gravity (L.C.G.) to obtain minimum hull resistance in terms of absorbed effective horse power according to speed and displacement. This is achieved either by the arrangement of the fuel tanks in such a way that, as fuel is burned off and speed consequently increased, the LCG progressively moves aft or by a fuel transfer system operated by a monitor with displacement and speed inputs as shown schematically in FIG. 19 of Assignee's patents in which fuel is pumped forward or aft of midships (station 5 in FIG. 3) by a fuel transfer system of conventional construction to adjust the LCG according to the ship's speed and displacement. This fuel transfer is more readily achieved with gas turbine machinery due to the lighter distillate fuels employed which reduce the need for fuel heating prior to being transferred and is particularly useful in vessels which encounter a variety of speed conditions during normal operation.

The advantages of the fuel transfer system, as applied to the MFS described herein are more clearly understood from experimental scale model tank test results on a conventionally propelled smaller MFS hull of 90 meters and 2870 tons.

Optimization of trim according to changes in vessel speed and displacement is also useful in ensuring optimum immersion of the waterjet pipes which require the point of maximum diameter of their outlet pipes to be level with the waterline when they are started with the ship at a standstill for proper pump priming. There are also several operational advantages of such a trim optimization system, particularly when using shallow water harbors.

An example of the Applicant's prior art ship, of which the present invention is an improvement, is as follows:

Principal Dimensions

| Length Overall | 774' 0" |
| Length Waterline | 79' 0" |
| Beam Molded | 116' 5" |
| Beam Waterline | 101' 8" |
| Depth Amidships | 71' 6" |
| Draft (Full Load) | 32' 3" |
| Length-to-beam ratio | 6.673 |

Displacement

| Overload | 29,526 long tons |
| Full Load | 24,800 long tons |
| Half-fuel Condition | 22,000 long tons |
| Arrival Condition | 19,140 long tons |
| Light Ship | 13,000 long tons |
| Displacement Length Ratio | 94.32 (overload) |
| | 79.2 (full load) |

Speed
40 to 50 knots in the half-fuel condition.
Endurance
The endurance is 3500 nautical miles with a 10% reserve margin.
Accommodations
Total of twenty (20) ship handling crew.
All accommodations and operational areas are to be air conditioned.
Propulsion Machinery
Eight (8) marine gas turbines, each developing an output power of about 50,000 HP in an air temperature of 80° F.
Four (4) waterjets, two with steering and reversing gear.
Four (4) combining speed reduction gearboxes.
Electric Power
Three (3) main diesel-driven a.c. generators and one emergency generator.

It is the intention of the present invention to reduce the fuel consumption of the prior art ship by providing a mono-hull fast ship (MFS) or semi-planing mono-hull (SPMH) with drag reduction to have the following characteristics:

1. Wherein the prohibitive drag rise which occurs at the "threshold speed" according to Froude's laws, is reduced by the hull lifting significantly—rather than "squatting", or sinking—at that speed.

2. Wherein the propulsion system's efficiency is not degraded by such high speeds, for which reason waterjets are proposed.

3. Wherein the high pressure excited beneath the hull, at and above the threshold speed, not only lifts the hull but is also synergistic with the requirements for optimum waterjet inlet efficiency.

4. Wherein the flow of water through the waterjet inlet ducts is beneficial to the resistance of the ship at operational speeds such as 40 to 50 knots, due to the added lift generated by the hydrodynamic forces acting within those ducts.

5. Wherein the characteristics of the hull shape contribute to seakeeping qualities as well as the reduced resistance of the hull at high speed.

6. Wherein sufficient power can be delivered using existing marine gas-turbine machinery coupled with waterjet propulsors based on those which, increasingly, are proving efficient and practicable in smaller high speed craft today.

7. Wherein the weight and cost of the structure, powerplants, propulsors, gearboxes, fuel and outfit are not so high as to prohibit the operation of a commercially viable transoceanic service carrying a combination of containerized and/or Roll-on/Roll-off cargo.

8. Wherein the characteristic neutral or high pressure over much of the wetted area of the hull induces substantially straight flow lines of the water, as substantiated by Applicant using computational fluid dynamics analysis, and also paint-streak tests using a model in a testing tank, the flow lines of water making an angle not exceeding seven degrees downward relative to the waterline of the ship as the water passes over the entire submerged portion of the hull aft of the bow section site where in accordance with the present invention as disclosed hereinafter a friction drag reducing substance is introduced in the water flow boundary layer adjacent the hull. The flow lines do not dip down from the bow towards the keel at greater angles relative to the waterline and rise towards the stern at greater angles as typifies experience with conventional mono-hulls of similar parameters at length Froude Numbers of 0.25 to 0.45, thus with the hull of the ship of the present invention there is created an ideal environment for the most efficient dispersal of drag reducing liquids or substances.

9. Wherein the pitching action of the hull in higher waves is reduced by the high pressure at the stern at and above a threshold speed of a length Froude Number of 0.40, thus improving the uniformity of the dispersal of the drag reducing liquids or substances over the forward immersed portion of the hull.

10. Wherein the provision of a number of ejectors for any drag reducing fluid or substance can reduce friction drag and hence fuel consumption for a given speed, displacement and power.

11. Wherein an optimised drag reducing method employing ejectors for dispersal of a mixture of polymer/air/water as particularly described in U.S. Pat. No. 6,357,374B1 and used in conjunction with a polymer mixing apparatus as described in U.S. Pat. No. 6,200,014B1, is rendered much more efficient than if used in conventional hulls of prior art. The disclosures of U.S. Pat. Nos. 6,357,374 B1 and 6,200,014 B2 are hereby incorporated by reference.

12. Wherein the use of waterjets for propulsion reduces the effect of propeller races drawing the mixture off the aft portion of the submerged hull and could benefit from ingestion of the mixture into their inlets, thus increasing propulsive efficiency.

As shown in FIG. 13 of the Applicant's U.S. Pat. Nos. 5,080,032, 5,129,343 and 5,231,946 and 5,832,856 the SPMH generic design of the present invention is operating in the most difficult speed regime, in which hull-form is important in achieving the foregoing characteristics of the present invention. The speed is insufficient to enable the ship fully to aquaplane, or "fly". Yet, conversely, the speed is too high to allow proven design techniques for traditional displacement hulls to be employed. Such techniques, necessary to reduce frictional resistance and delay the onset of prohibitive residuary or "wavemaking" resistance, or "wave-drag", are in fact quite contrary to the requirements of both hull and waterjet efficiency within and beyond the defined "threshold" speed. This particularly applies in a ship with the low length beam ratio, wide transom and high displacement ratio of the present invention. In this intermediate speed regime such as between 40 to 50 knots features of the hull-form are significant to the technological and commercial viability of the invention.

The present invention overcomes the problems and limitations encountered in prior art hull designs and propulsion systems for fast commercial ships in excess of 2000 tons and pleasure craft in excess of 600 tons.

The present invention provides of a fast yet large commercial ship such as a cargo ship or vehicle ferry in excess of 2000 tons which, by high speed without prohibitive power attains a greater turnover on investment to offset the higher capital and operating costs.

The present invention achieves a seaworthiness in open ocean conditions superior to that of current commercial ship and pleasure craft designs.

The present invention provides a greater frequency of service per ship and less need to visit several ports on each side of an ocean crossing to increase the cargo loaded onto a ship of sufficient length and size necessary to achieve the high speed required to reduce crossing time significantly.

The present invention attains a wider operating speed envelope which allows more flexible scheduling and greater on-time dependability.

The present invention provides a commercial ship with smaller or shallow harbor access and greater maneuverability than the prior art of similar tonnage, thanks to having waterjets and a built-in trimming or fuel transfer system rather than conventional underwater appendages such as rudders or propellers.

The present invention may be configured in a commercial ship having a waterline length (L) of about 680 feet, an overall beam (B) of about 115 feet, and a full load displacement of about 25,000 to 30,000 tons. However, it is generally applicable to pleasure craft in excess of 600 tons and 200 feet and commercial ships in excess of 2000 tons.

For purposes of steering, a system employing wing waterjets may be used. Furthermore, the wing waterjets can incorporate a reversing system. As a result, a ship utilizing the disclosed invention will be maneuverable at standstill.

The present invention utilizes a known MFS design with inherent hydrodynamic lift and low length-to-beam (L/B) ratio but in a combination with gas turbine power and waterjet propulsion which requires, for best efficiency, high pressure at the inlet of the waterjets which corresponds to the stern area of the MFS where high pressure is generated to lift the hull.

An advantage of a waterjet propulsion system in the MFS hull is its ability to deliver large amounts of power at high propulsive efficiency at speeds of over 30 knots and yet decelerate the ship to a stop very quickly. The system also largely eliminates the major problems of propeller vibration, noise and cavitation. A principal advantage of the integrated MFS and waterjet system is that the shape and lift characteristics of the hull are ideal for the intakes and propulsive efficiency of the waterjet system, while the accelerated flow at the intakes also produces higher pressure and greater lift to reduce drag on the hull even further.

Since it is advantageous for waterjet propulsion systems to have an area of higher pressure in the vicinity of the water inlet and since a wider flat transom area is required to install the jet units, the MFS hull is ideally suited for waterjet propulsion. A highly efficient propulsion system, combined with gas turbine main engines, can be provided to meet the higher power levels required for large, high speed ships.

The low length-to-beam ratio of the present invention provides for greater usable cargo weight and space and improved stability.

The waterjet propulsion system provides greater maneuverability than with propellers due to the directional thrust of the wing waterjets and the application of high maneuvering power without forward speed.

The waterjet propulsion units or pumps driven by marine gas turbine units of the present invention produce an axial or mixed flow of substantial power without the size, cavitation and vibration problems inherent in propeller drives.

Reduced radiated noise and wake signatures are produced by the invention due to the hull design and waterjet propulsion system.

The MFS hull may be economically produced in available commercial shipyards.

Marine gas turbine engines which are used by the present invention presently produce, or are being developed, to produce greater power for a lower proportional weight, volume, cost and specific fuel consumption than has been available with diesel or steam powered propeller drives.

The MFS hull underwater shape avoids the traditional drag rise in merchant ships. Due to the MFS hull shape of the present invention, the stern of the ship begins to lift (thereby reducing trim) at a speed where the stern of a conventional hull begins to squat or sink.

The present invention combines the power and weight efficiencies of marine gas turbines, the propulsive efficiency of waterjets, and the hydrodynamic efficiency of a MFS hull shaped to lift at speeds where traditional hulls squat. The present invention finds particular utility for maritime industry vessels in excess of approximately 200 feet overall length, approximately 28 feet beam and 15 feet draft and approximately 600 tons displacement.

A merchant ship, according to the present invention would utilize eight conventional marine gas turbines of the type currently manufactured by General Electric under the designation LM 5000 or LM 6000 and four waterjets of the general type currently manufactured by Riva Calzoni or KaMeWa. The waterjet propulsion system has pump impellers mounted at the transom and water ducted to the impellers from under the stern through inlets in the hull bottom just forward of the transom. The inlets are disposed in an area of high pressure to increase the propulsive efficiency of the waterjet system.

The acceleration of flow created by the pumps within the inlet pipes produces additional dynamic lift which also increases the efficiency of the hull. The result is an improvement in overall propulsive efficiency compared to a hull with a conventional propeller propulsion system, with the most improvement in propulsion efficiency beginning at speeds of about 30 knots.

Maneuvering is accomplished with two wing waterjets, each wing jet being fitted with a horizontally pivoting nozzle to provide angled thrust for steering. A deflector plate directs the jet thrust forward to provide stopping and slowing control. Steering and reversing mechanisms are operated by hydraulic cylinders positioned on the jet units behind the transom. Alternatively, conventional rudders can be used.

A ship in accordance with the present invention will be able to transport up to 10,000 tons of cargo at an average speed of 37 to 45 knots across the Atlantic Ocean in about 3 to 4 days in sea states up to 5, with a 10% reserve fuel capacity.

An integrated control system may be provided to control gas turbine fuel flow and power turbine speed, and gas turbine acceleration and deceleration, to monitor and control gas turbine output torque, and to control the waterjet steering angle, the rate of change of that angle, and the waterjet reversing mechanism for optimum stopping performance. Such a system may use as inputs parameters which include ship speed, shaft speed, gas turbine power output (or torque).

The foregoing control system will allow full steering angles at applied gas turbine power corresponding to a ship speed of about 20 knots. It will progressively reduce the applied steering angle automatically at higher power and ship speeds and further allow full reversing of the waterjet thrust deflector at applied gas turbine power corresponding to a ship speed of around 20 knots. Moreover, the control system will automatically limit waterjet reversing deflector movement and rate of movement at higher power and control the gas turbine power and speed to be most effective at high ship speeds.

In summary, the improved ship of the present invention has the following advantages 1. Lower hull resistance at high ship speeds compared to a conventional merchant ship hull of the same size and proportions.

2. Unlike a conventional merchant ship at such speed, a larger portion of the overall resistance is due to frictional, rather than residuary or wave drag, which is crucial to the application of drag reducing technology in accordance with the present invention. Likewise, computational fluid analysis of the flow pattern of water, as it passes along the hull of the present invention, demonstrates that it is straight in the longitudinal plane. There is no tendency for it to be directed downwards towards the keel, as applies in conventional hulls as they approach the threshold speed of a length Froude No. of 0.40. This is optimal for maximum efficiency of the drag-reduction technology.

3. Sufficiently high displacement length ratio to enable commercial cargoes to be carried without recourse to expensive lightweight structures.

4. High inherent stability allowing a large quantity of cargo to be carried above the main deck with adequate reserve of stability.

5. High inherent stability having the effect that there is no requirement for the vessel to be ballasted as fuel is consumed, thus providing increasing top speed at constant power with distance traveled.

6. Low length beam ratios providing large usable internal volume compared with a similar displacement high speed conventional vessel.

7. Large potential reserve of damage stability.

8. Ability to operate at high speed in adverse weather conditions without (a) causing excessive hull strength problems (b) having adverse subjective motion (c) excessive bow emergence, hull-slamming and deck wetness.

9. Ability to operate effectively and efficiently on two, three, or four waterjets due to a favorable combination of hull, waterjet and gas turbine characteristics.

10. Ability to accommodate four large waterjets across the ship transom and provide sufficient bottom area for their intakes.

11. Integration of the waterjet/gas turbine propulsion system being optimized by the aft section hull form.

12. Lower technical risk than a conventional hull form of similar displacement for the speed range 40 to 50 knots due to use of waterjets rather than large, complex and less efficient propeller systems.

13. Superior maneuverability at both low and high speeds and ability to stop in a much shorter distance.

14. Ability to utilize a fuel trimming system, as would be incorporated in the design for ensuring optimum longitudinal center of gravity at all speeds and displacements, for other uses such as operating in shallow water or for amphibious purposes.

15. Dispensing with rudders or propellers and associated appendages reducing the possibility of underwater damage in shallow water, maneuvering or in amphibious operations.

16. A drag reduction system installed below the waterline which reduces friction drag by between 60 and 80 percent, in addition to the ship experiencing a reduction of overall drag of between 15 and 30 percent due to hydrodynamic lifting of the stern between speeds of 30 and 40 knots, thus enabling a corresponding reduction in power and fuel consumption for a given speed and displacement; or an increase in speed for a given power and fuel consumption and displacement; or an increase in displacement for a given speed, power and fuel consumption. The expenditure rate of the friction reducing material, polymer in the example embodiment, must be minimal and its cost must be substantially less than that of the fuel saved, for which the present invention is optimum for exploiting the drag-reduction technology employed.

17. A drag-reducing method which in the preferred embodiment permits exploitation of ejector units of the type disclosed in U.S. Pat. No. 6,357,574 B1 and an Additive Handling System Module of the kind disclosed in U.S. Pat. No. 6,200,014 B1. The disclosures of these patents are incorporated by reference.

18. Due to the characteristic neutral or high pressure over much of the wetted area of the hull inducing substantially straight flow lines of the water, as substantiated by Applicant's computational fluid dynamics analysis, and by paint-streak tests on a model in a testing tank, where the straight flow lines make an angle not exceeding seven degrees downward relative to the waterline as the water passes over the entire submerged portion of the hull., rather than dipping down from the bow towards the keel at greater angles relative to the waterline and rising towards the stern, as typifies experience with conventional mono-hulls of similar parameters at length Froude Numbers of 0.25 to 0.45, creating thereby an ideal environment with the improved ship of the invention for the most efficient dispersal of drag reducing liquids or substances with the minimum expenditure of polymer or other drag reducing material.

19. Due to reduced bow emergence and pitching in high seas at speeds at and above the threshold speed, a more uniform flow of water along the forward submerged portion of the hull.

20. Due to the use of water jets for propulsion, reduction of the drag-reducing mixture being drawn off the hull into propeller races and possibly reducing the boundary layer in water jet inlets, thus increasing propulsive efficiency 21. Due to the foregoing, a more competitive rate premium compared with other sea and air freight services for the conveyance of high value and/or time-sensitive cargo, with the option to reduce power and fuel consumption or increase displacement or speed for any given ship condition.

To this end it is necessary to describe the major physical and operational characteristics of the improved ship of the present invention. These are:

1. A hull which is optimised for operation at a length Froude Number above a threshold speed of 0.30 and up to 0.9.

2. A length-to-beam ratio (the waterline length in feet divided by the maximum waterline width, or beam, in feet, expressed as L/B) of between 5 and 7.5.

3. A displacement length ratio or the displacement in long tons, divided by the cube of one percent of the waterline length in feet, expressed as $$\frac{D}{L^3/100},$$

of between 60 and 150.

4. A specific power (the shaft horsepower divided by the product of the displacement in long tons and the speed in knots, expressed as SHP/D×V of less than 1.0.

5. The bottom portion of the hull having a longitudinal profile which is non-convex relative to the center of the ship, the contour of which depends on the normal operating speed and displacement of the ship, rising from a point of maximum depth forward of the longitudinal center of the hull to a point of minimum depth at the transverse stern or transom, such minimum depth being less than 60% of the maximum depth.

6. The transom width at the datum waterline being at least 85% of the maximum width of the hull at the datum waterline.

7. The transverse sections of the hull, from about 30% of the ship's length aft of the forward perpendicular (or conjunction of the stern with the datum waterline) to the stern, being rounded at their conjunction with the sides of the hull and being non-concave in section on each side of the keel or centerline, except for those of about the forward 25% of the ship's length, which are concave and meet the sides of the hull in a "knuckle".

8. A hull in which the sides are non-concave in plan-form at the datum waterline.

9. The maximum angle of deadrise (the angle between the upward slope of the bottom transverse sections and horizontal) at the transom being less than 10°.

An improved ship in accordance with the present invention includes a hull producing a high pressure area at a bottom portion of a stern which rises from a point of maximum depth forward of a longitudinal center of the hull to a point of minimum draft at a transom which produces hydrodynamic lifting of the stern at a threshold speed above a length Froude Number of 0.30; sides of the hull at the datum waterline are non-convex in plan with reference to a centerline of the ship; a length-to-beam ratio at the datum waterline is between 5 and 7.5 and a displacement to length ratio equal to a displacement of the hull divided by a cube of the length divided by 100 during operation of the hull in carrying fuel and payload is between 60 and 150 and a maximum operating Froude Number is between 0.42 and 0.9. At least one channel is disposed downwardly on each of the ship's sides below the waterline. The channels are fitted with ejector units, preferably of the type disclosed in U.S. Pat. No. 6,357,374 B1, for the distribution of a drag reducing substance, preferably a mixture of polymer, air and water to reduce turbulence at the boundary layer and, hence, friction drag. At least one Additive Handling System Module, preferably of the kind disclosed in U.S. Pat. No. 6,200,014B1, is employed to introduce the correct quantities of the drag reducing material, e.g. powdered polymer, air and water contained within the hull, or drawn from outside it, and connected to the mixing ejectors by a piping system. At least one hopper or container is provided to carry the powdered polymer prior to passing via the Additive Handling Module to be mixed with air and seawater at the ejectors. At least one waterjet is disposed within the hull with each waterjet having an inlet in a bottom portion of the stern which produces high pressure during motion of the ship. At least one power unit is disposed on one of the at least one lower deck coupled to the at least one waterjet for powering the at least one waterjet to cause water to be drawn into the inlet of the at least one waterjet to produce forward motion of the hull. At least one air intake and at least one exhaust are associated with each of the at least one power unit and extend from the at least one power unit upward past the at least one cargo deck and outboard of a plurality of the longitudinally extending rail pairs of each of at least one cargo carrying deck.

The minimum draft of the ship is less than 60 percent of the maximum draft. A width of the stern at a datum waterline is at least 85 percent of a maximum width of the hull at the datum waterline which produces hydrodynamic lifting of the stern at a threshold speed above a length Froude Number of 0.30. The bottom portion of the hull has transverse sections which forward of the stern are convexly rounded with reference to a baseline of the ship at the point of conjunction with sides of the hull and which relative to the baseline of the ship are non-concave in section on each side of a keel except for sections within less than 25 percent of a length of the ship aft from a forward perpendicular which are concave and meet the side of the ship in a knuckle. A maximum angle of a dead rise of sections at the stern is 10 degrees.

An improved ship further in accordance with the present invention includes a hull producing a high pressure area at a bottom portion of a stern which rises from a point of maximum depth forward of a longitudinal center of the hull to a point of minimum draft at a transom with the minimum draft being less than 60 percent of the maximum draft; a width of the stern at a datum waterline being at least 85 percent of a maximum width of the hull at the datum waterline which produces hydrodynamic lifting of the stern at a threshold speed above a length Froude Number of 0.30; the bottom portion having transverse sections which forward of the stern are convexly rounded with reference to a baseline of the ship at the point of conjunction with sides of the hull and which relative to the baseline of the ship are non-concave in section on each side of a keel except for sections within less than 25 percent of a length of the ship aft from a forward perpendicular which are concave and meet the sides of the ship in a knuckle; sides of the hull at the datum waterline are non-convex in plan with reference to a centerline of the ship and a maximum angle of deadrise of sections at the stern is a maximum of 10 degrees; at least one channel disposed downwardly on the ship's sides below the waterline is fitted with ejector units for the distribution of a mixture of polymer, air and water to reduce turbulent or boundary layer and, hence, friction drag; at least one Additive Handling System Module to introduce the correct quantities of powdered polymer, air and water is contained within the hull, or drawn from outside it, and connected to the mixing ejectors by a piping system; at least one hopper or container to carry the powdered polymer prior to passing via the Additive Handling Module to be mixed with air and seawater at the ejectors; at least one waterjet is disposed within the hull with each waterjet having an inlet in a bottom portion of the stern which produces high pressure during motion of the ship; at least one power unit is disposed on one of at least one lower deck coupled to the at least one waterjet for powering the at least one waterjet to cause water to be drawn into the inlet of the at least one waterjet to produce forward motion of the hull; and at least one air intake and at least one exhaust are associated with each of the at least one power unit and extend from the at least one power unit upward past the at least one cargo deck and outboard of the plurality of longitudinally extending rail pairs of each of at least one cargo carrying deck.

A length-to-beam ratio at the datum waterline is between 5 and 7.5 and a displacement-to-length ratio equal to a displacement of the hull divided by a cube of the length divided by 100 during operation of the hull in carrying fuel and payload is between 60 and 150 and a maximum operating Froude Number is between 0.42 and 0.9. The ship has a waterline length over 215 feet.

A mechanism is provided for controlling a longitudinal trim of the hull in response to changes in ship speed and displacement. The mechanism comprises fuel tanks disposed within the hull and a mechanism for transferring the fuel from within the fuel tanks to move a longitudinal center of gravity aft with respect to the hull. At least one waterjet is disposed within the hull and an inlet of the at least one waterjet being disposed in the high pressure area of the stern having a maximum angle of deadrise of 10 degrees. A gas turbine is coupled to the at least one waterjet for supplying power for driving the at least one waterjet to cause water to be drawn into the inlet of the at least one waterjet and expelled from the at least one waterjet.

The at least one waterjet has an impeller which is coupled to the gas turbine by a shaft and gearbox. At least one outboard waterjet is disposed on each of a opposed sides of the transom which provide forward thrust and have a mechanism for steering and control of the ship and at least one additional jet providing only forward thrust is disposed between the outboard waterjets on opposed sides of the transom. An electric motor is coupled to the at least one waterjet for supplying power for driving the at least one waterjet to cause water to be drawn into the inlet of the at least one waterjet and expelled from the at least one waterjet. The hull has a waterline length of between 600 and 700 feet; and a maximum operating speed is above 34.5 knots with a length Froude Number in excess of 0.42. The displacement is greater than 600 tons. At least one waterjet is disposed within the hull and the at least one waterjet has an inlet in a non-concave section of the bottom portion with reference to the baseline which produces the high pressure area during motion of the ship; and wherein a maximum operating Froude Number is not greater than 0.9.

The at least one waterjet has an inlet in a non-concave section of the bottom portion with reference to the baseline which produces the high pressure area during motion of the ship and wherein a maximum Froude number is not greater than 0.9. The hull has a non-convex longitudinally profile with respect to the baseline aft of the point of maximum depth.

A vessel in accordance with the invention includes a hull having a non-stepped profile which produces a high pressure area at the bottom of the hull in a stern section of the hull which intersects a transom to form an angle having a vertex at the intersection and hydrodynamic lifting of the stern section at a threshold speed without the hull planing across the water at a maximum velocity determined by a Froude Number, the hull having a length in excess of 200 feet, a displacement in excess of 2000 tons, and a Froude Number in between 0.42 and 0.90; at least one inlet located within the high pressure area; at least one waterjet coupled to the at least one inlet for discharging water which flows from the inlet to the waterjet for propelling the vessel; a power source coupled to the at least one waterjet for propelling water from the at least one inlet through the waterjet to propel the vessel and to discharge the water from an outlet of the waterjet; acceleration of water into the at least one inlet and from the at least one waterjet produces hydrodynamic lift at the at least one inlet which is additional to the lifting produced by the bottom of the hull in the high pressure area which increases efficiency of the hull and reduces drag; a weatherdeck closing a top of the hull, at least one cargo carrying deck disposed below the weatherdeck and at least one lower deck disposed below the at least one cargo carrying deck; a plurality of longitudinally extending rail pairs extending along at least one cargo carry deck from the stern toward a bow of the hull, each rail pair for guiding at least one trolley with each trolley conveying cargo from an exterior of the hull through an opening in the stern along one of the longitudinally extending rail pairs toward the bow to a position where the cargo is lowered from being conveyed by the at least one trolley into contact with the at least one cargo carry deck; at least one waterjet disposed within the hull with each waterjet having an inlet in a bottom portion of the stern which produces high pressure during motion of the ship; at least one power unit disposed on one of the at least one lower deck coupled to the at least one waterjet for powering the at least one waterjet to cause water to be drawn into the inlet of the at least one waterjet to produce forward motion of the hull; and at least one air intake and at least one exhaust associated with each of the at least one power unit which extend from the at least one power unit upward past the at least one cargo deck and outboard of the plurality of the longitudinally extending rail pairs of each of the at least one cargo carrying deck. The power source is at least one gas turbine.

A vessel in accordance with the invention includes a hull having a non-stepped profile which produces a high pressure area at the bottom of the hull in a stern section of the hull which intersects a transom to form an angle having a vertex at the intersection and hydrodynamic lifting of the stern section at a threshold speed without the hull planing across the water at a maximum velocity determined by a Froude Number, the hull having a displacement in excess of 2000 tons, and a Froude Number in between 0.42 and 0.90; at least one inlet located within the high pressure area; at least one waterjet coupled to the at least one inlet for discharging water which flows from the inlet to the waterjet for propelling the vessel; a power source coupled to the at least one waterjet for propelling water from the at least one inlet through the waterjet to propel the vessel and to discharge the water from an outlet of the waterjet; acceleration of water into the at least one inlet and from the at least one waterjet produces hydrodynamic lift at the at least one inlet which is additional to the lifting produced by the bottom of the hull in the high pressure area which increases efficiency of the hull and reduces drag; at least one waterjet disposed within the hull with each waterjet having an inlet in a bottom portion of the stern which produces high pressure during motion of the ship; at least one power unit disposed on one of the at least one lower deck coupled to the at least one waterjet for powering the at least one waterjet to cause water to be drawn into the inlet of the at least one waterjet to produce forward motion of the hull; and at least one air intake and at least one exhaust associated with each of the at least one power unit which extend from the at least one power unit upward past the at least one cargo deck and outboard of the plurality of the longitudinally extending rail pairs of each of the at least one cargo carrying deck. The power source is at least one gas turbine.

A vessel conveying method in accordance with the invention includes the steps: hydrodynamically lifting a stern section of a vessel hull at a threshold ship speed by virtue of a high pressure region at the bottom of the hull with the hull having a non-stepped profile, a length in excess of 200 feet, a displacement in excess of 2000 tons, and a Froude Number in between 0.42 and 0.90; propelling the hydrodynamically lifted hull via a waterjet system having water inlets in the high pressure region with the hull not planing across the water at a maximum velocity determined by the Froude Number; and accelerating water flow into the inlets to increase the pressure in the high pressure region and to produce further lifting of the hull which increases efficiency of the hull and reduces drag; and further reducing frictional drag of the hull of the ship by introducing a friction reducing substance along a boundary layer of the water flowing along the outside of the hull. The method can be practiced where the ship further includes a weatherdeck closing a top of the hull, at least one cargo carrying deck disposed below the weatherdeck and at least one lower deck disposed below the at least one cargo carrying deck; a plurality of longitudinally extending rail pairs extending along at least one cargo carrying deck from the stern toward a bow of the hull, each rail pair for guiding at least one trolley with each trolley conveying cargo from an exterior of the hull through an opening in the stern along one of the longitudinally extending rail pairs toward the bow to a position where the cargo is lowered from being conveyed by the at least one trolley into contact with the at least one cargo carry deck; at least one waterjet disposed within the hull with each waterjet having an inlet in a bottom portion of the stern which produces high pressure during motion of the ship; at least one power unit disposed on one of the at least one lower deck coupled to the at least one waterjet for powering the at least one waterjet to cause water to be drawn into the inlet of the at least one waterjet to produce forward motion of the hull; and at least one intake and at least one exhaust associated with each of the at least one power unit which extend from the at least one power unit upward past the at least one cargo deck and outboard of the plurality of the longitudinally extending rail pairs of each of the at least one cargo carrying deck. In the ship the waterjet system is driven with at least one gas turbine.

The combination of all the above features in accordance with the present invention satisfies the many conflicting requirements of the particular speed regime for which the hull is intended such as operation between 40 and 50 knots, this with the improved efficiency afforded by the incorporation of the friction reducing apparatus in accordance with the invention. To combine such speed with the necessary economy of construction, stability, load carrying capacity, seaworthiness and practicability required for effective commercial, military or recreational operation, in combination with enhanced in port loading efficiency is a major advantage of the improved ship of this invention over any prior art ship design.

With either propeller or waterjet propulsion systems, it is desirable to accommodate all the propelling means within the extreme dimensions of the hull of the ship. This is why a wide transom is an essential feature of the present invention; transom width is a major physical requirement of the present invention in providing the desired speed of operation such as 40 to 50 knots since transom width limits the size and hence power of both waterjets and propellers.

FIG. 11 of Applicant's aforementioned patents shows a shaft horsepower comparison between an MFS frigate (curve A with the circle data points) and a traditional frigate hull (curve B with the triangular data points) of the same length/beam ratio and 3400 tons displacement. Between about 15 and approximately 29 knots both ships require similar power. From 38 up to 60 knots the MFS would operate within the area of its greatest efficiency and benefit increasingly from hydrodynamic lift. This speed range would be largely beyond the practicability for a traditional displacement hull unless the length of a displacement hull was increased substantially in order to reduce speed length ratio or the length to beam ratios were substantially increased. Hydrodynamic lift in an MFS design is a gentler process which is more akin to a high speed performance sailing boat than the planing hull which is raised onto the plane largely by brute force. An MFS does not fully plane and thereby avoids the problem of slamming against waves at high speeds.

In addition, modem large ships have traditionally been propeller driven with diesel power. Propellers are, however, inherently limited in size, and they also present cavitation and vibration problems. It is generally recognized that applying state-of-the-art technology, 60,000 horsepower is about the upper limit, per shaft, for conventional fixed pitch propellers. Moreover, diesel engines sized to produce the necessary power for higher speeds would be impractical because of weight, size, cost and fuel consumption considerations. If the speed categories in relation to waterline length shown in FIG. 13 of the Assignee's patents herein are examined, the MFS provides fast commercial ships. FIG. 13 of the Applicant's patents shows a continuum of sizes of semi-planing hulls, small to very large. The MFS is similar in hull form to that which is widely used today in small craft because it offers the possibility of using a displacement length ratio approaching that of displacement hulls and maximum speeds approaching that of planing hulls.

Therefore it is a feature of the present invention that the waterjet inlet pipes are disposed alongside each other, in parallel at the most favorable point in the high pressure area generated under the aft portion of the ship. Due to the inherent wide beam or low length beam ratio, and the wide transom design, there is more space available for implementing this arrangement, thus increasing the proportional limiting maximum power which can be delivered by the waterjets. This is a significant feature of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9iiA and 9iiB illustrate several views of the triple-slot ejector units used in the ship of the invention;

FIG. 9iii illustrates a channel extending downwards below the waterline, having been fabricated into the underwater hull plating, seen from above, into which the multiple ejector units are to be slotted and fastened;

FIG. 9iv illustrates the ejector units of the example embodiment being slotted and fastened into the at least one channel fabricated into the underwater hull plating as illustrated in FIG. 9iii;

FIGS. 10iiA, 10iiB and 10iiC show the results of an analysis by paint streak tests in a testing tank of the water flow-lines along the wetted area of portions of an inverted model hull constructed in accordance with the hull form illustrated in FIGS. 10iA and 10iB, at a length Froude Number of 0.31, showing substantially straight and uniform water flow-lines with downward angles of less than seven degrees with reference to the water line along the entire length of the hull from forward paint stations 159, through midship paint stations 160 to aft paint stations 161;

FIGS. 11i, 11iA, 11iB, 11iC, 11iD and 11iE illustrate by profile and sectional drawings, the British naval vessel HMS 'Highburton' 162 employed in the model paint-streak tests and full scale measurements described in the 1969 Dove et al. report in which it is reproduced as Annex 'B', FIG. 8(a), showing a polymer hopper and mixing and dispensing unit carried above a 250 gallon tank of diluted polymer powder 163 carried on the forward deck of, the HMS 'Highburton' having a typical conventional hull of very close similarity in terms of length, beam and displacement, to the improved ship of the invention and Applicant's prior art hull form 158 as depicted in FIGS. 10iA and 10iB, suitable for speeds of a length Froude Number of up to a threshold speed of about 0.30. The position of the forward and aft ejection slots 164 and 165 are also shown.

FIGS. 11iiA, 11iiB and 11iiC illustrate analyses of subsequent paint streak tests in a testing tank (reproduced from FIG. 12 of the 1969 Dove et al. report) showing the water flow-lines of the forward portion of a model of the British naval vessel HMS 'Highburton' illustrated in FIGS. 11i and 11iA-11iE, of similar length, beam and displacement to the hull of the foregoing FIGS. 10iA, 10iB and 10iiA, 10iiB and 10iiC, at length Froude Numbers of 0.19, 0.29 and 0.34, respectively, in which the water flow-lines 166 are seen to be sucked further down towards the keel as speed increases, at a downward angle of up to twenty degrees relative to the waterline at a Length Froude No. of 0.34, thus reducing the effective area over which the polymer/air/water mixture can adhere to the hull, increasing the number of ejectors and amount of mixture required for its even distribution and reducing the efficiency of the drag-reduction method, as summarized in the aforementioned report;

FIG. 12ii illustrates an analysis by Applicant using computational fluid dynamics of the water flow lines 166 applied to the aft portion of a hull of the present invention at a length Froude Number of 0.38 demonstrating substantially straight and uniform water flow-lines with reference to the waterline as it exceeds the threshold speed, passing through a length Froude Number of 0.40. A vertical keel or skeg 65 is incorporated as per the assignee's prior art which can be helpful in preventing the crossflow of a drag reducing substance beneath the keel, which could reduce efficiency

FIG. 13ii illustrates an analysis by Applicant using computational fluid dynamics of the water flow lines 166, at a speed of 40 knots, applied to the aft portion of a hull of the present invention at a length Froude Number of 0.435 demonstrating substantially straight and uniform water flow-lines at angles of not exceeding 5 degrees with reference to the waterline as it exceeds the threshold speed, passing through a length Froude Number of 0.40, with no appreciable tendency for the flow-lines (166) to be drawn towards the keel as speed is increased.

FIG. 14ii illustrates a 'Shipflow' c.f.d., analysis of a ship hull according to the present invention at a speed of 40 knots at a similar Froude No., exhibiting an insignificant area of lowest pressure 168, a reduced area of only medium low pressure 169, while the greater part of the significant submerged hull aft of the drag reduction outlet channel 147 is shown to create an area of neutral pressure 170 at a length Froude Number of 0.435, with areas of highest significant pressure 171 at the bow and beneath the stern. This prevalence of neutral or high pressure occasions the reduction in the angle of the water flow-lines relative to the waterline at higher Froude Numbers such that the flow lines are substantially straight relative to the waterline, e.g. make an angle of less than or equal to ($\leqq$) 7° with respect to the waterline. The variation in pressure gradients of the present invention is measurably less abrupt than in the prior art shown in FIG. 14i.

DETAILED DESCRIPTION

The present invention is an improvement of the Applicant's U.S. Pat. Nos. 5,080,032, 5,129,343, 5,231,946 and 5,832,856 by providing an improved hull design with reduced drag which improves commercial competitiveness with other transportation modes. In its preferred form the hull is designed in accordance with the Assignee's prior art patents described in FIGS. 1-5 above. In the example embodiment of the present invention shown in FIGS. 6-10iB, the monohull surface ship 100 includes an apparatus 101 for introducing a drag reducing substance into the boundary layer of water flowing over a submerged portion of the hull 102 in substantially straight flow lines relative to the waterline 103 to reduce skin-friction over a relatively large wetted area of the hull at speeds exceeding a length Froude number of 0.25.

Figure 1:
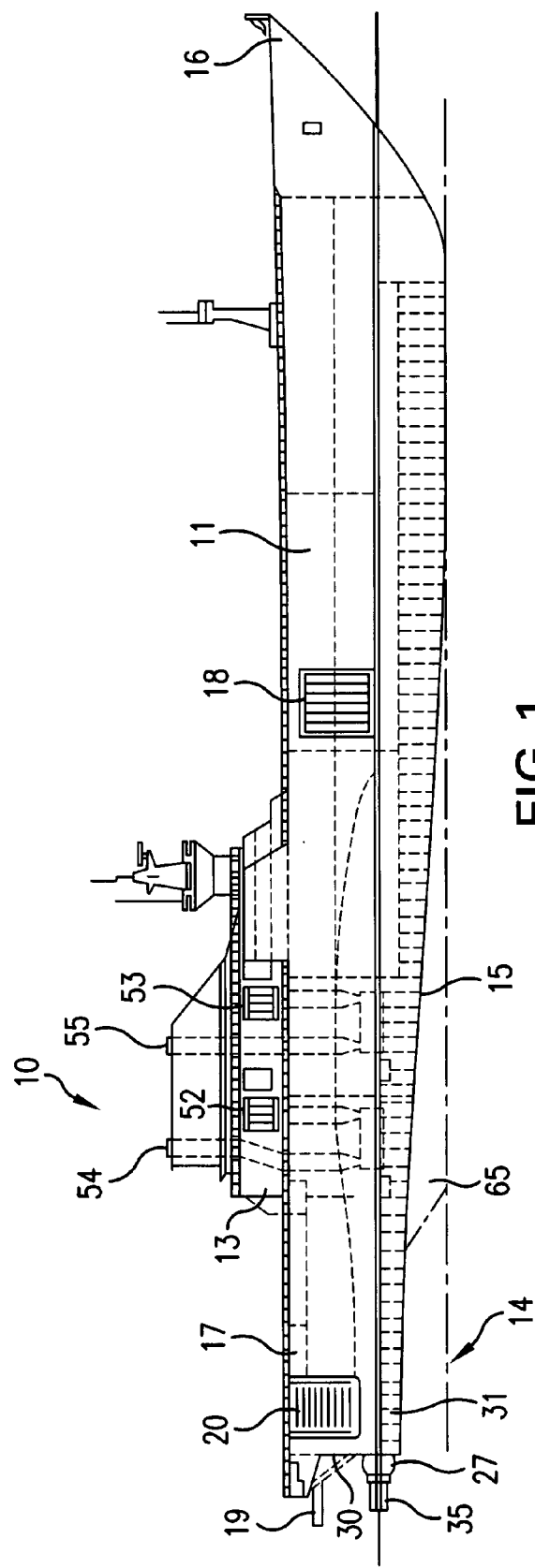
FIG. 1 is a prior art side elevational or profile view of the starboard side of a ship in accordance with the Applicant's patents to which the friction drag reducing apparatus of the invention can be applied in accordance with the present invention.
Figure 2:
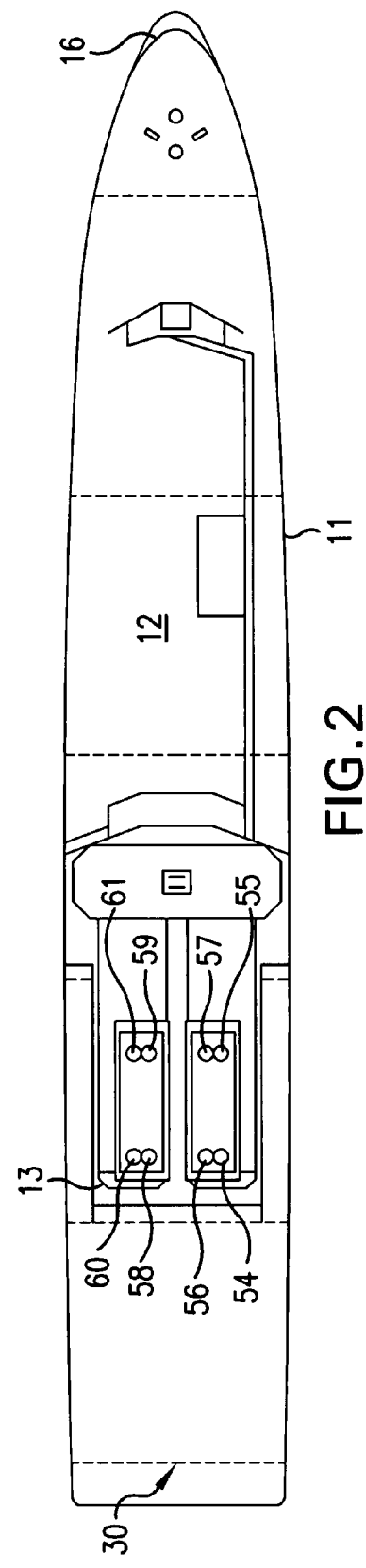
FIG. 2 is a top plan view of the ship shown in FIG. 1.
Figure 3:
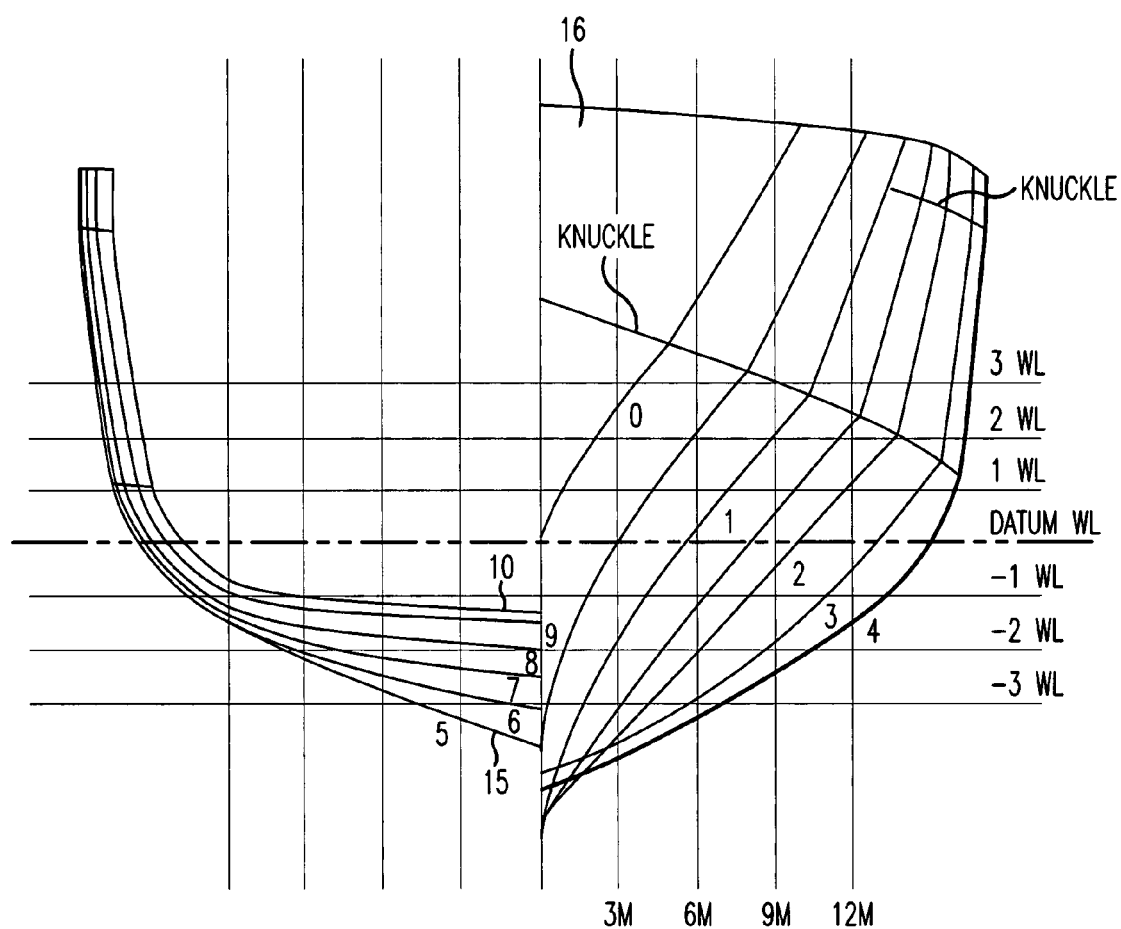
FIG. 3 is a presentation of the sections of the hull showing different contour lines at stations along the length of the hull shown in FIG. 1, half from the bow section and half from the stern section.
Figure 4:
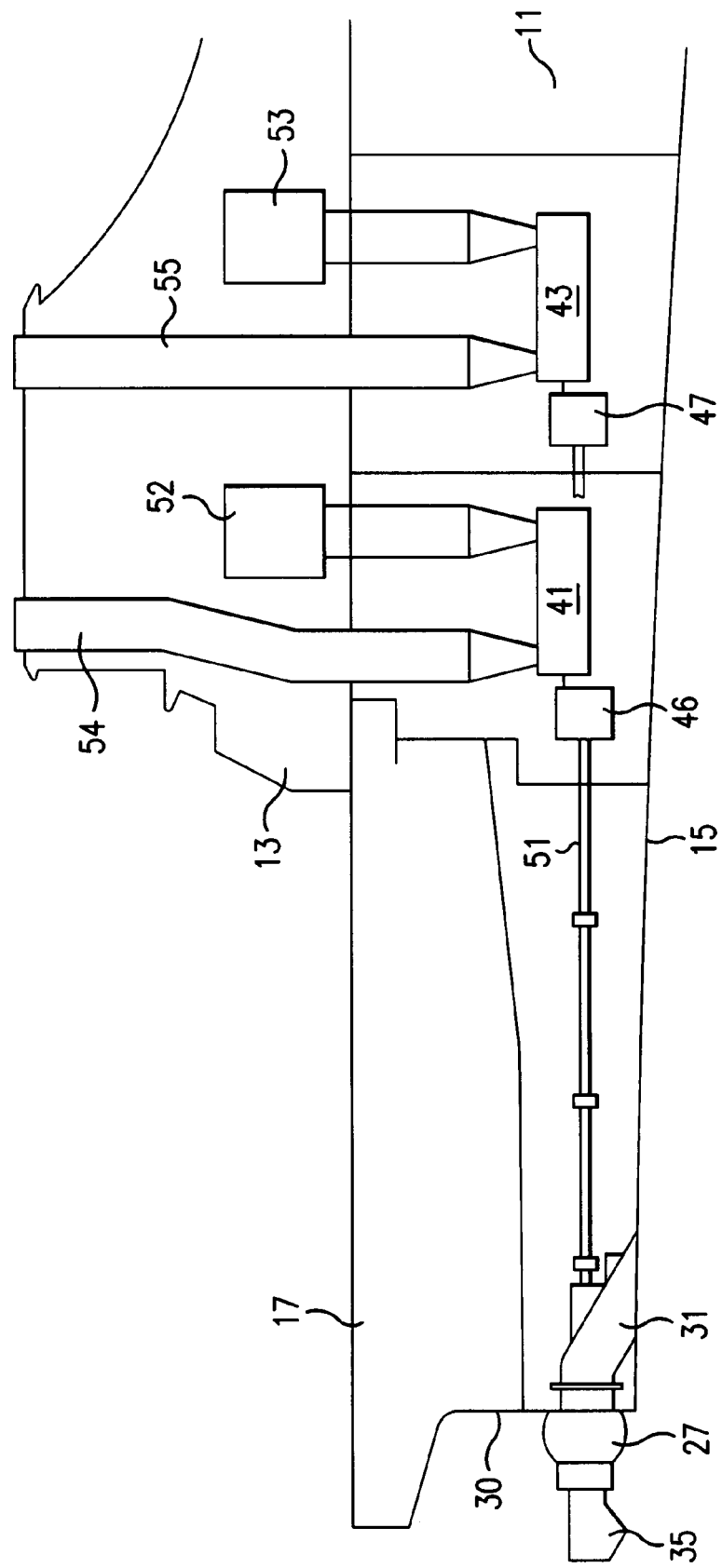
FIGS. 4 and 5 are respectively schematic side elevational and top views showing the arrangement of the water propulsion/gas turbine units within the ship shown in FIG. 1.
Figure 5:
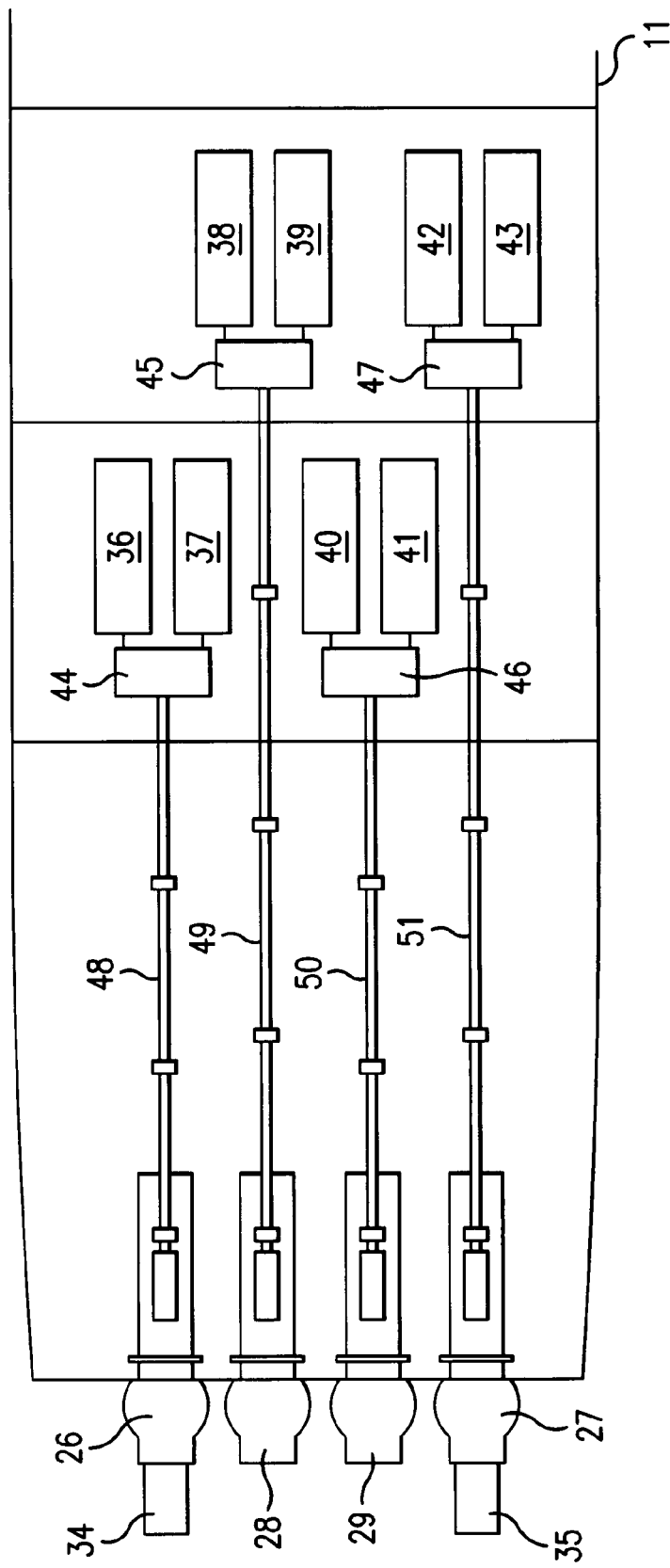
Figure 6:
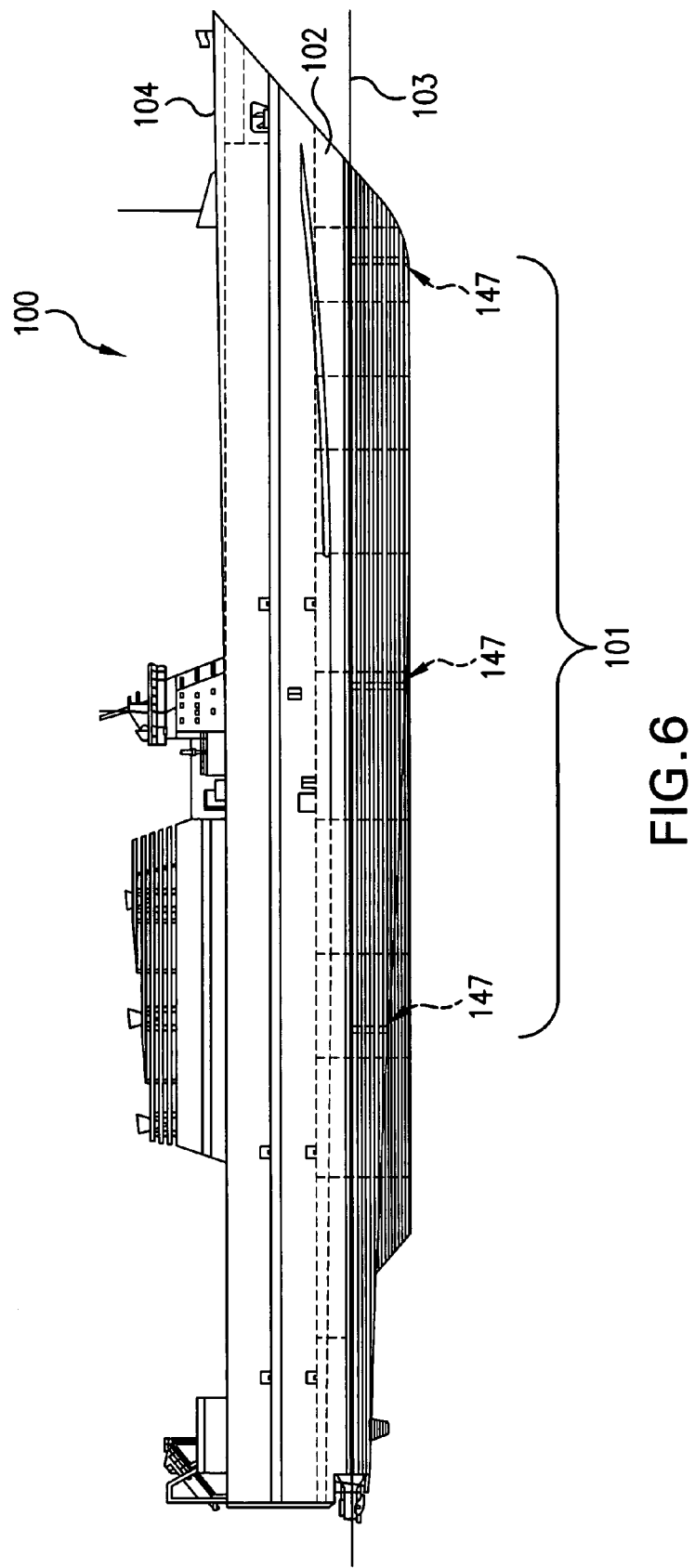
FIG. 6 is a side elevational or profile view of the starboard side of an embodiment of the improved ship in accordance with the present invention, the ship's hull and propulsion system being constructed in accordance with the Assignee's patents as shown in FIGS. 1-5 and incorporating a drag reduction system in accordance with th invention.
Figure 9I:
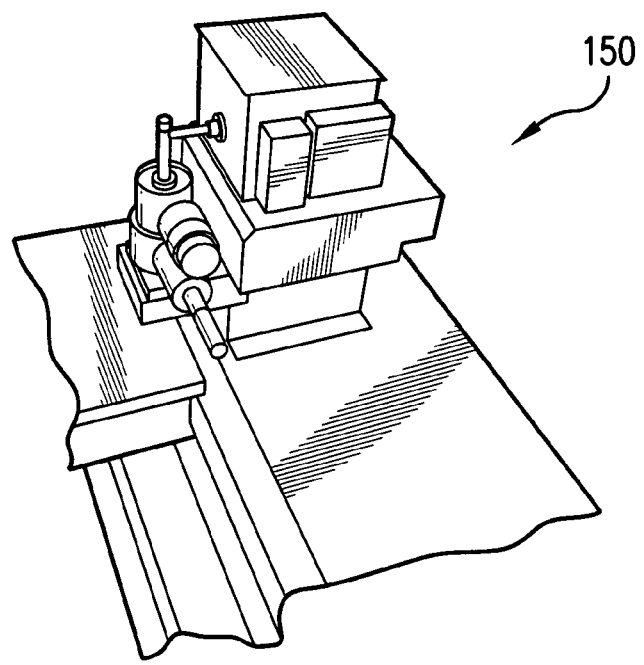
FIGS. 9iA and 9iB are respectively a perspective view from above and to one side and a cross-sectional view through a longitudinal axis of an Additive System Handling Module of the drag reduction system of FIGS. 6-8.
Figure 9I:
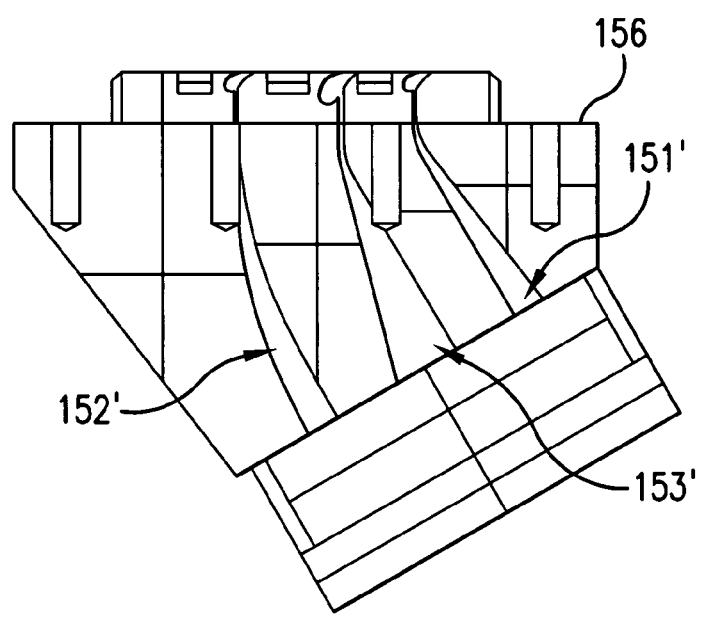
Figure 9I:
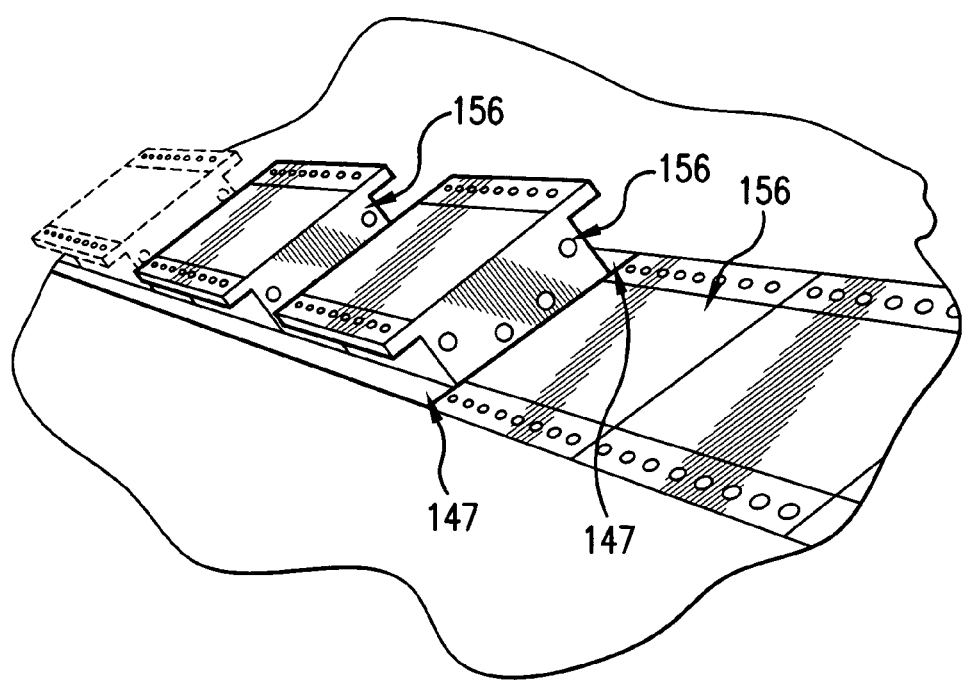
Figure 10I:
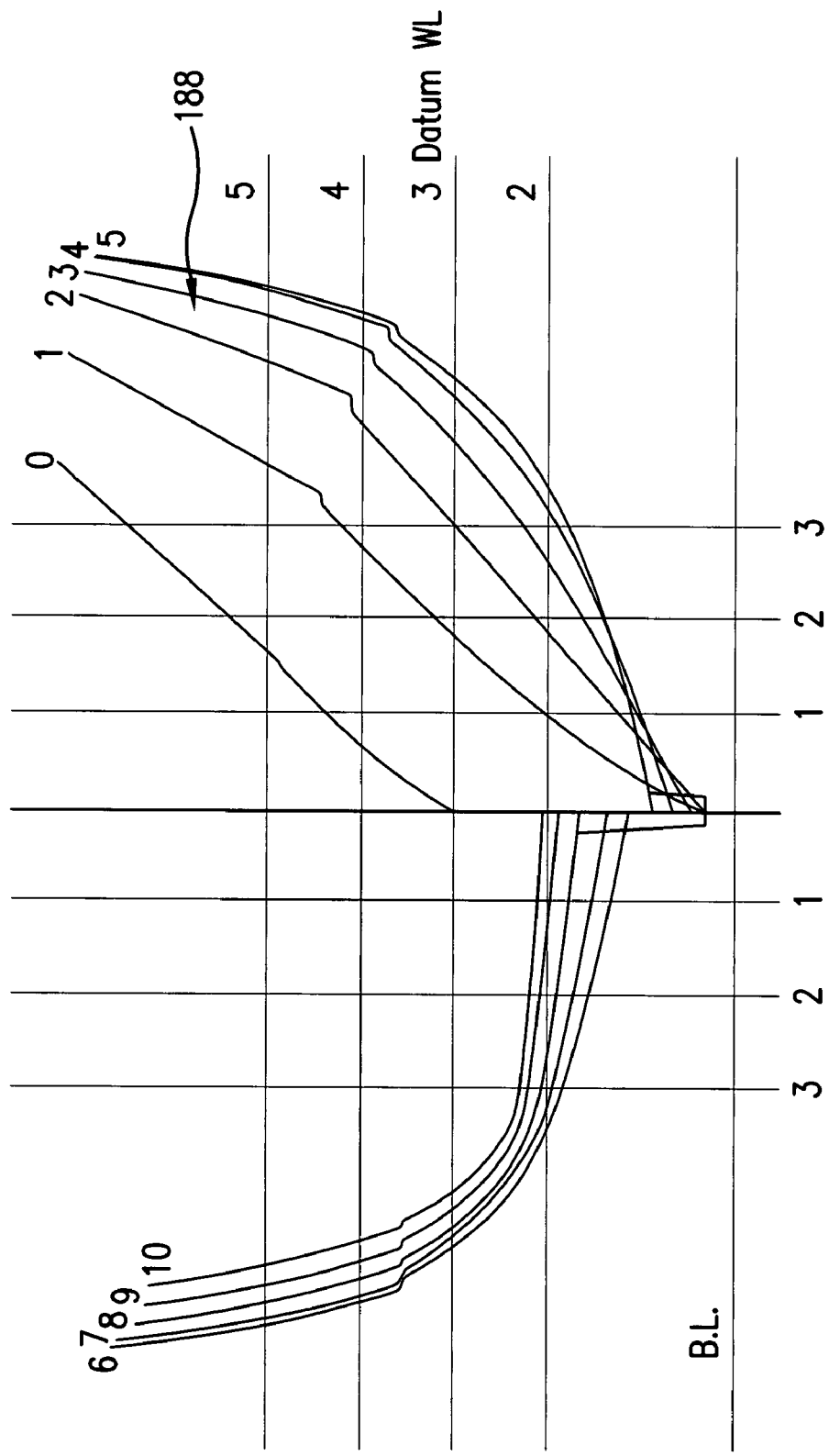
FIGS. 10iA and 10iB illustrate, respectively, by profile and sectional drawings, a hull of a ship having a hull form according to present invention, constructed according to the Applicant's aforementioned prior art patents, a model of which was subjected to paint-streak tests the results of which are illustrated in FIGS. 10iiA, 10iiB and 10iiC.

The apparatus 101 for introducing a drag reducing substance includes of at least one channel 147 extending downwards on each side of the outside of the hull in the area of the bow 104 of the ship. In the example embodiment three channels are provided on each side of the hull, one in the area of the bow, one in the midship area and another oft of the midship area as shown in FIG. 6. The channels are incorporated within the hull plating 148 in the example embodiment as depicted in FIG. 9iii. Openings 158 are formed through the hull plating in the channels.

Ejectors 156 have connectors 157 which are fitted into openings 158 in the channels to permit ejection of a drag reducing substance into the boundary layer of water flowing over a submerged portion of the hull in substantially straight flow lines relative to the waterline 103 to reduce skin-friction over a relatively large wetted area of the hull at speeds exceeding a length Froude number of 0.25. In the embodiment the channels 147 are situated vertically and symmetrically on each side of the hull, extending from the waterline to the keel around the outside hull plating so that the ejectors, when in place, are flush with the hull plating. Each channel may be disposed as a continuous fitting over the full distance from the waterline to the keel, or staggered in sections for improved hydrodynamic performance.

Figure 7:
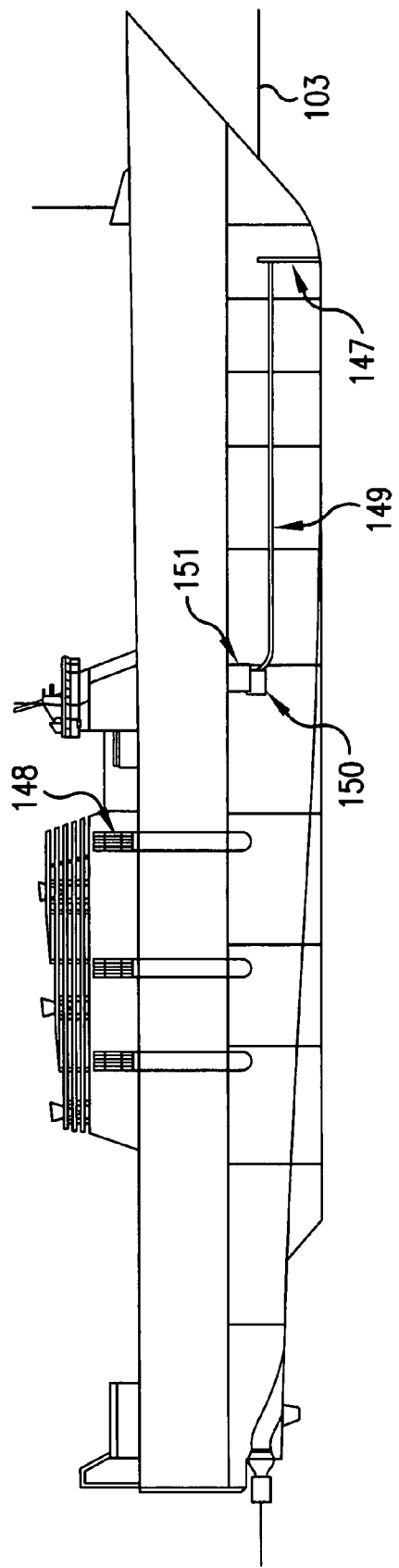
FIGS. 7 and 8 are respectively a side elevation view and a top plan view showing the polymer powder, seawater and air or gas of the drag reduction system of the ship of FIG. 6.
Figure 8:
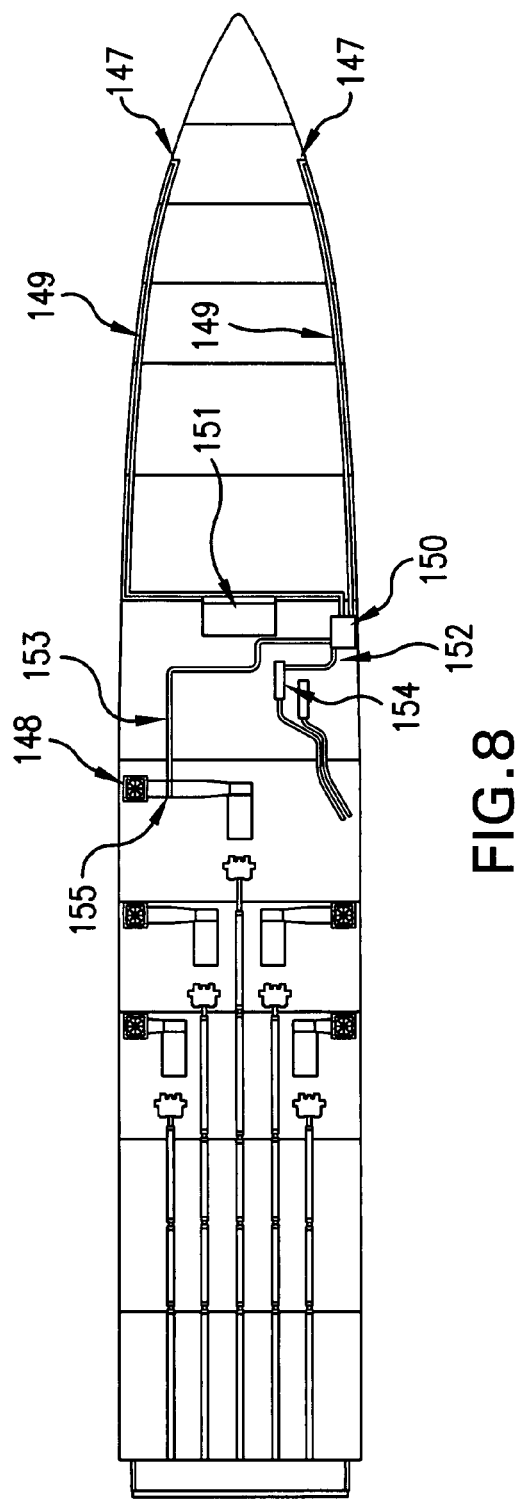

The apparatus 101 for introducing a drag reducing substance to the ejectors 156 in the channels 147 in the area of the bow of the ship is shown in FIGS. 7 and 8. The drag reducing substance in the embodiment is a mixture of polymer powder, seawater and air or gas. Each of these components is distributed separately within the hull through pipes by low pressure created at the ejectors by vortex-generators or, if necessary, pumped to the at least one channel on each side of the hull and, via the ejectors fitted therein, are released as a polymer-water-air mixture into the boundary layer. The ejectors are fed via supply pipes 149 from at least one Additive System Handling Module 150 which is supplied with polymer powder from at least one container or hopper 151 carried beneath the lower cargo deck. Warmed sea water 152 and air or gas 153 are also supplied to the same proximity from at least one diesel generator cooling water system 154 and at least one gas turbine air intake 155.

The Additive System Handling Module 150 of the apparatus 101 in the example embodiment, as shown in FIGS. 9iA and 9iB serves to blend the polymer with seawater and mix the constituent parts of polymer, seawater and air or gas as they are released through a number of the Slot Fluidic Ejectors 156 via coanda surfaces, three separate vortex-generators in each ejector blending the constituent parts of the mixture as they are released, the size and shape of each vortex-generator being optimised according to the physical properties of the additive being distributed. A construction of the type shown in the U.S. Pat. No. 6,200,014 B1 can be used for the Module 150.

The ejectors 156 used in the ship 100 are triple-slot ejector units, each preferably constructed according to U.S. Pat. No. 6,357,374 B1. As depicted in FIGS. 9iiA, 9iiB and 9iii, the ejectors are slotted at 151', 152' and 153' for respectively conveying diluted polymer powder, warmed seawater and air or gas into the appropriate vortex generators with coanda surfaces built into the ejectors. Supply pipes 149 connected to orifices sited inside the at least one channel 147 carry the individual mixture components to the respective slots of the ejectors. FIG. 9iv shows the ejector units being fastened into the channel fabricated into the underwater hull plotting as illustrated in FIG. 9iii.

A store of powdered polymer is contained within the ship, which polymer passes via an Additive Handling System Module and thence passes to the plurality of ejectors situated within the at least one channel extending downwardly in the hull plating on each side of the underwater portion of the ship. The ejectors exude a combination of polymer, air and seawater drawn from the feed system within the ship and this enables the non-disruptive ejection of fluids into the selected near-wall region of the boundary layer of a fluid flow of the sea water adjacent the hull.

Applicant calculates that the present invention will lower the fuel consumption of Applicant's patented designs by 15 to 30 percent at the normal commercial operating speed of 30 to 40 knots, thus further improving their competitiveness compared with other surface and air freight modes. The hull of the ship and the propulsion system in the example embodiment is like the prior art of FIGS. 1-5 except that at least one container for powdered polymer is fitted within the ship to feed, via the Additive System Handling Module, and the plurality of ejectors mounted in the at least one downwardly disposed channel, incorporated into the plating symmetrically on each side of the hull from the waterline to the keel, preferably in the vicinity of the bow of the ship so that substantially the entire wetted area of the hull (virtually the entire wetted area of the hull aft of the ejectors) has its friction drag reduced by the friction drag reducing material being ejected because of the substantially straight water flow lines over the hull.

Warm water and air or gas are also distributed from within the hull to the ejectors via the referenced piping system. As noted above, the ejectors, when fitted in place in the channels, are completely flush with the hull plating. The ejectors are fed via the supply pipes 149 from the at least one Additive System Handling Module which is supplied with polymer powder from the at least one container or hopper carried beneath the lower cargo deck. Warmed sea water and air are also supplied from the same proximity. As illustrated in FIG. 8, the polymer mixture, seawater and air or gas are distributed separately within the hull through the pipes by low pressure created at the ejectors by the vortex-generators or, if necessary, pumped to the at least one channel on each side of the hull and, via the ejectors fitted therein, are released as a polymer-water-air mixture into the boundary layer, where the mixture spreads evenly across the hull surface.

As noted above, FIGS. 9$i$A, 9$i$B, 9$ii$A and 9$ii$B illustrate the means by which the constituent parts of the polymer/seawater/air or gas mixture are released through three separate vortex-generators in each ejector and are thus mixed as they are released, the size and shape of each vortex-generator being optimized according to the physical properties of the additive being distributed.

In the example embodiment the ship has an 11 meter long channel 147 on each side in the bow section of the ship. The length of each ejector can vary between 9 and 22 inches, depending upon the hull and configuration. With a length of 1 foot for the ejector, about 36 ejectors would be employed along each 11 meter channel, but the number of ejectors could varied as will be apparent to the skilled artisan. As noted previously, channels 147 with ejectors could also be provided on each side of the ship in its mid section and aft section in accordance with the invention as shown in FIG. 6. The drag reducing substance is preferably Polyox WSR 309, a 309 series of polymer available commercially, but other polymers, copolymers, microbubbles and other materials could be used as the friction drag reducing substance in accordance with the invention.

Figure 12I:
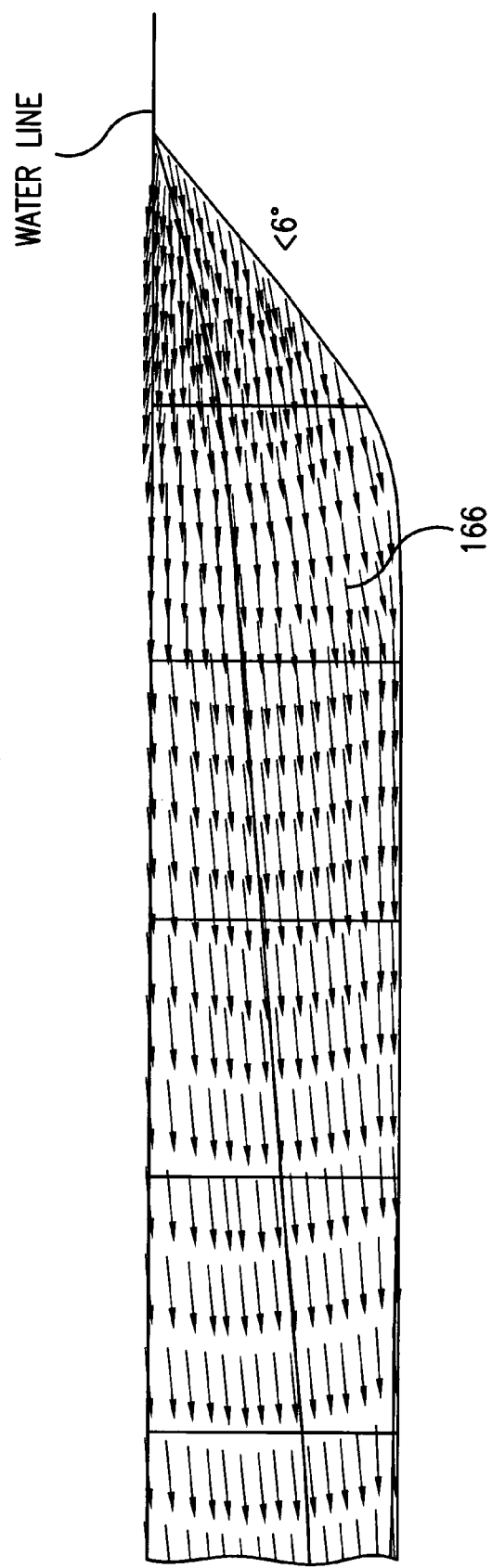
FIG. 12i illustrates an analysis by Applicant using computational fluid dynamics of the water flow lines 166 applied to the forward portion of a hull of the present invention at a length Froude Number of 0.38 demonstrating substantially straight and uniform water flow-lines at angles of not exceeding 6 degrees with reference to the water line as it approaches the threshold speed of a length Froude Number of 0.40
Figure 12I:
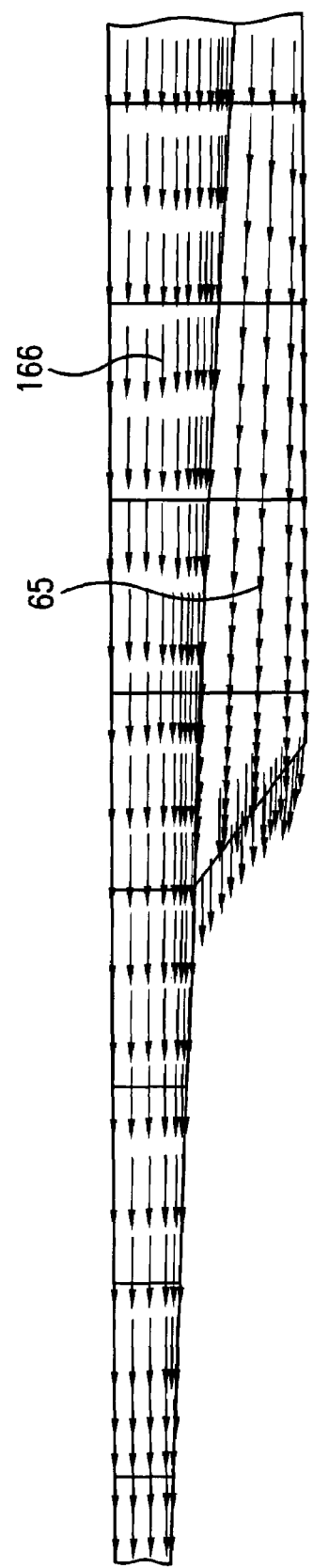
Figure 13I:
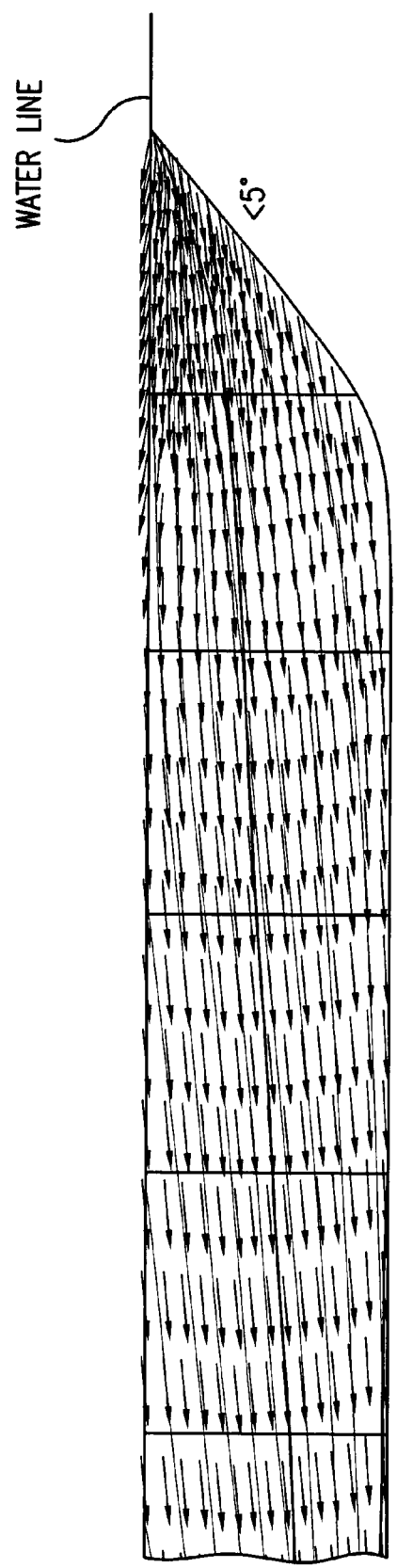
FIG. 13i illustrates an analysis by Applicant using computational fluid dynamics (c.f.d.) of the water flow lines 166, at a speed of 40 knots applied to the forward portion of a hull of the present invention at a length Froude Number of 0.435 demonstrating substantially straight and uniform water flow-lines at angles of not exceeding 5 degrees with reference to the waterline as it exceeds the threshold speed, passing through a length Froude Number of 0.40, with no appreciable tendency for the flow-lines (166) to be drawn towards the keel as speed is increased.
Figure 13I:
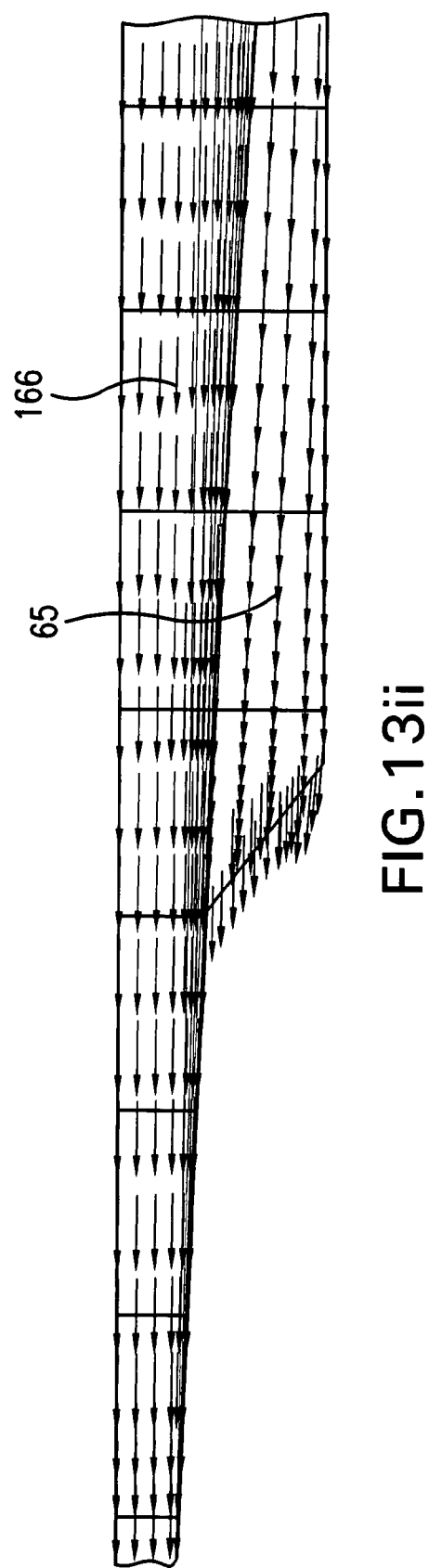
Figure 14I:
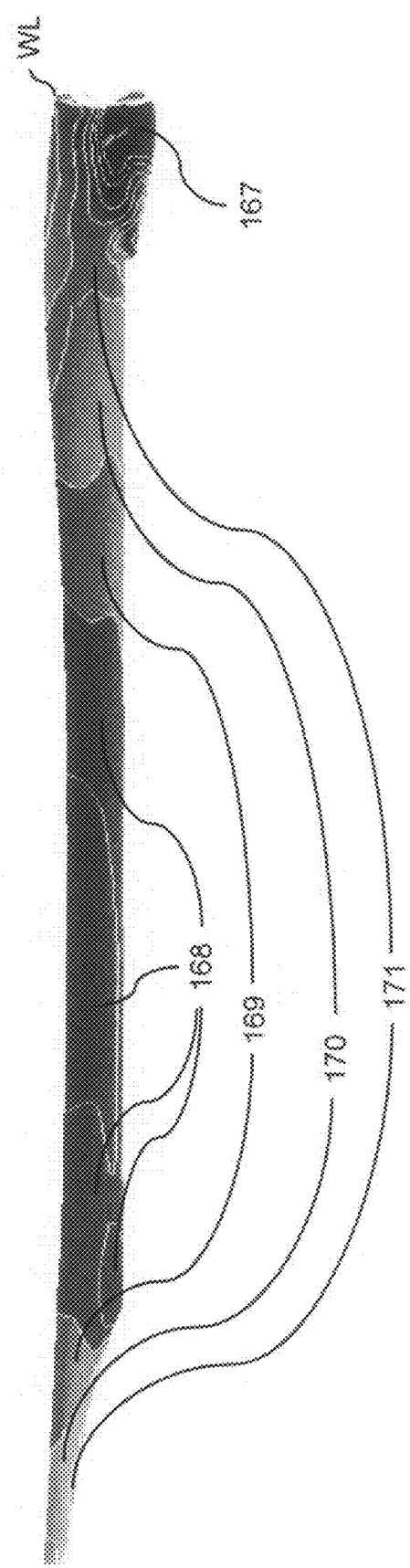
FIG. 14i illustrates a 'Shipflow' c.f.d., analysis of a slender destroyer or frigate hull, similar to that tested in a testing tank for the 1969 Paper by Dove, Canham, Catchpole and Long, in which the authors claim (Introduction, p. 1, para. 1.2) only a 30 percent reduction in friction drag; and that only under conditions not practically feasible because of the quantity of friction reducing material required, this being a similar reduction at a similar Froude No. to that which was achieved in full scale with H.M.S. 'Highburton'. The color-coded areas correspond to areas of pressure generated over the significant submerged portion of the hull aft of the sonar dome 167, ranging from lowest pressure 168: darkest blue through medium low-pressure 169: mid-blue to neutral pressure 170: dark green to highest significant pressure 171: mid-green, in which the greater part of the significant submerged hull is shown to create a large area of lowest pressure 168 over the greater part of the submerged hull at a Froude No. of 0.40. This low-pressure occasions acceleration of water passing across the submerged hull surface, generating the greater angle of water flow-lines relative to the waterline, which characterize conventional hulls of prior art.
Figure 14I:
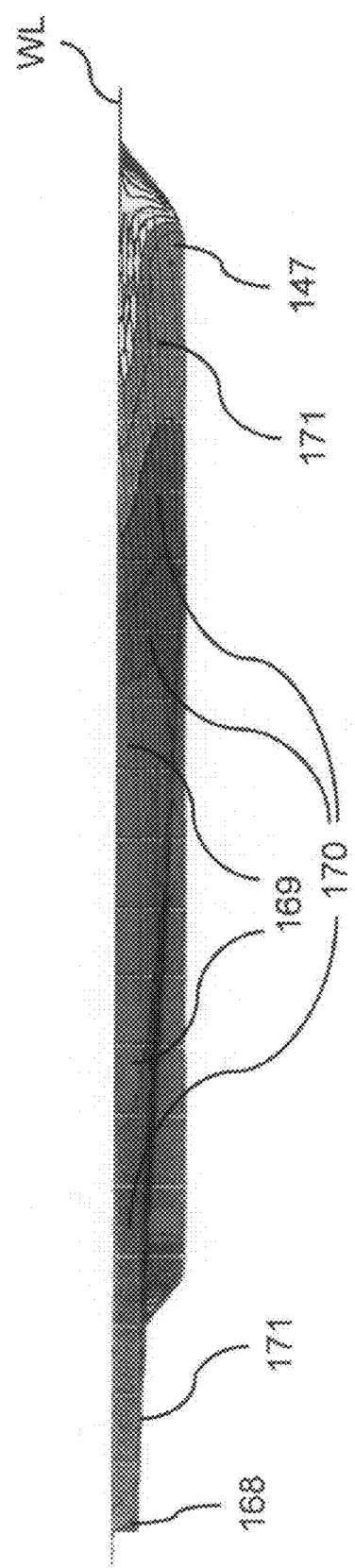
Figure 15:
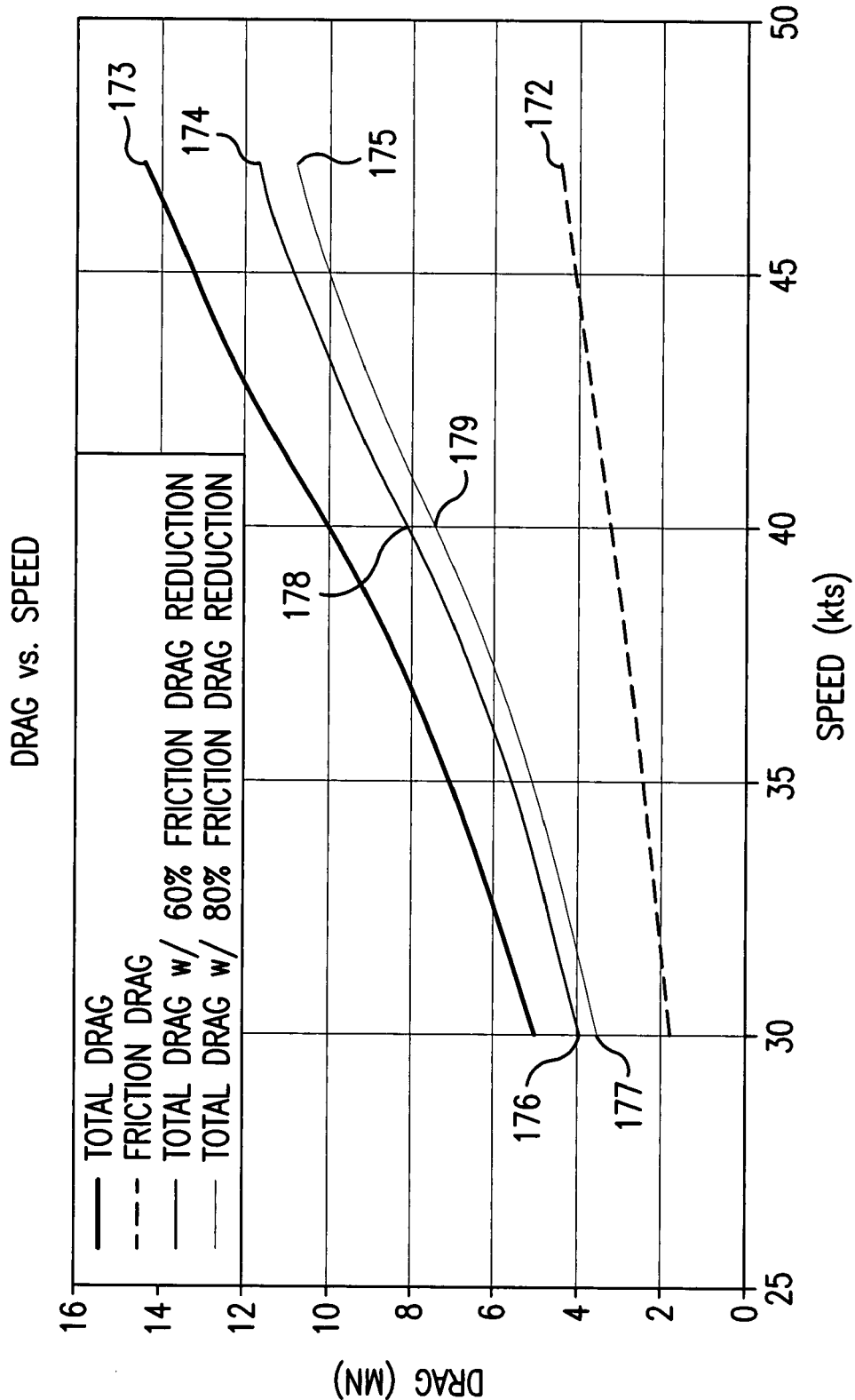
FIG. 15 graphically illustrates an initial estimate of the vessel speed versus drag (power or propulsion load), showing friction drag without drag reduction (line 172) and total drag without drag reduction (line 173, which includes wave drag), and showing total drag with a 60 percent reduction in friction drag (line 174) and total drag with an 80 percent reduction in friction drag (line 175) achievable with the present invention.

The estimated improved efficiency of the monohull surface ship of the present invention is graphically shown in FIG. 15. With a 60 percent reduction in friction drag at an operating speed of 30 knots (length Froude Number=0.38) with the ship of the invention, the reduction in power is approximately 20 percent (point 176); and with an 80 percent reduction in friction drag (point 177), the reduction in power is 28 percent. With a 60 percent reduction in friction drag at an operating speed of 40 knots (length Froude Number=0.435), the reduction in power is approximately 20 percent (point 178); and with an 80 percent reduction in friction drag the reduction in operating power is approximately 25 percent (point 179). These are length Froude Numbers at which a conventional vessel of prior art and of the same dimensions and displacement, even assuming a 60 or 80 percent friction drag reduction, (not heretofore practically possible), could expect to achieve an overall power reduction of only minimal proportions due to its greater proportion of wave drag compared with friction drag; and due to the substantially and increasingly non-straight and non-uniform water flow-lines, relative to the waterline, generated by a greater area of lower pressure beneath the hull as it passes through the threshold speed of a length Froude Number of 0.30, as demonstrated in FIGS. 11$ii$A, 11$ii$B, 11$ii$C and FIG. 14$i$. These water flow characteristics and pressure variations are in clear contrast with those of the ship of the present invention as shown in FIGS. 12$i$, 12$ii$, 13$i$, 13$ii$, and 14$i$ wherein the flow lines are substantially straight relative to the waterline and the variations in pressure are less abrupt.

While the present invention has been described in terms of its preferred embodiments, it should be understood that numerous modifications may be made thereto without departing from the spirit and scope of the invention. It is intended that all such modifications fall within the scope of the appended claims.

I claim:

1. A semi-planing, monohull surface ship operable at speeds exceeding a length Froude number of 0.25 comprising:

a hull having a profile which produces a high pressure area at a bottom portion of the hull in a stem section of the hull and hydrodynamic lifting of the stern section at a speed above a length Froude number of 0.30;

at least one inlet located within the high pressure area;

at least one waterjet coupled to the at least one inlet for discharging water which flows from the inlet to the waterjet for propelling the vessel;

a power source coupled to the at least one waterjet for propelling water from the at least one inlet through the waterjet to propel the vessel and to discharge the water from an outlet of the waterjet;

an apparatus for the non-disruptive ejection of a drag reducing substance which includes a polymer into a boundary layer of water flowing over a submerged portion of the hull in substantially straight flow lines relative to a waterline to reduce skin-friction over a relatively large wetted area of the hull at speeds exceeding a length Froude number of 0.25.

2. The ship according to claim 1, wherein said apparatus for introducing a drag reducing substance introduces the drag reducing substance at least in the area of the bow of the ship.

3. The ship according to claim 1, wherein said apparatus for introducing a drag reducing substance includes a plurality of ejectors within hull plating below the waterline.

4. The ship according to claim 3, wherein the plurality of ejectors are situated in at least one channel extending downward on each side of the hull incorporated within the hull plating.

5. The ship according to claim 3, wherein the apparatus for the non-disruptive ejection of a drag-reducing substance further includes a mixer for mixing a drag-reducing material with a liquid to form the drag reducing substance to be ejected by said ejectors.

6. The ship according to claim 1, wherein the apparatus for introducing a drag reducing substance includes:
- a nozzle that produces an axial velocity gradient with a fluid, which includes a drag reducing material, that is passed through said nozzle to form said drag reducing substance;
- a vortex chamber that is positioned to be activated, by the fluid that has passed through said nozzle, to thereby form a vortex or system of vortices within the fluid in the vortex chamber; and
- a first ejector having an aperture for ejecting the fluid into a flow of the water flowing past the hull, said aperture formed to include a Coanda surface as a portion thereof.

7. The ship according to claim 1, wherein the hull has a length in excess of 200 feet, a displacement in excess of 2000 tons, a Froude number between 0.42 and 0.90 and a length-to-beam ratio between about 5.0 and 7.0.

8. The ship according to claim 1, wherein said apparatus for the non-disruptive ejection of a drag reducing substance reduces skin-friction over substantially the entire wetted area of the hull aft of a site of introduction of the drag reducing substance into the boundary layer of water flowing over a submerged portion of the hull.

9. The ship according to claim 1, wherein said apparatus introduces the drag reducing substance into the boundary layer of water flowing over a submerged portion of the hull in substantially straight flow lines which make an angle of less than or equal to 7° relative to the waterline.

* * * * *